US012603520B2

(12) United States Patent
Elshafie et al.

(10) Patent No.: US 12,603,520 B2
(45) Date of Patent: Apr. 14, 2026

(54) CONTROL OF ENERGY HARVESTING OPERATION IN A USER EQUIPMENT

(71) Applicant: QUALCOMM Incorporated, San Diego, CA (US)

(72) Inventors: Ahmed Elshafie, San Diego, CA (US); Huilin Xu, Temecula, CA (US); Yuchul Kim, San Diego, CA (US); Linhai He, San Diego, CA (US); Seyedkianoush Hosseini, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 357 days.

(21) Appl. No.: 17/849,527

(22) Filed: Jun. 24, 2022

(65) Prior Publication Data

US 2023/0420987 A1    Dec. 28, 2023

(51) Int. Cl.
*H02J 50/00*      (2016.01)
*H04W 72/23*      (2023.01)
*H04W 76/28*      (2018.01)

(52) U.S. Cl.
CPC ........... *H02J 50/001* (2020.01); *H04W 72/23* (2023.01); *H04W 76/28* (2018.02)

(58) Field of Classification Search
CPC ........... H04W 52/0216; H04W 52/028; H04W 52/0235; H04W 52/0229; H04W 72/23;
(Continued)

(56) References Cited

U.S. PATENT DOCUMENTS

| | | | |
|---|---|---|---|
| 2005/0186994 A1* | 8/2005 | Rahmel | H02J 50/001 455/343.1 |
| 2007/0173214 A1* | 7/2007 | Mickle | H02J 50/001 455/127.1 |

(Continued)

FOREIGN PATENT DOCUMENTS

| | | | | |
|---|---|---|---|---|
| WO | WO-2016071686 A1 * | 5/2016 | | H02J 50/001 |
| WO | WO-2019192698 A1 * | 10/2019 | | H04W 52/0206 |

OTHER PUBLICATIONS

Lee M., et al., "Energy Harvesting Discontinuous Reception (DRX) Mechanism In Wireless Powered Cellular Networks", IET Communications, The Institution of Engineering and Technology, GB, vol. 11, No. 14, Sep. 28, 2017, pp. 2206-2213, XP006063629, ISSN: 1751-8628, DOI: 10.1049/IET-COM.2016.0841, the whole document.

(Continued)

*Primary Examiner* — Mehmood B. Khan
(74) *Attorney, Agent, or Firm* — Loza & Loza, LLP

(57) ABSTRACT

The aspects described herein allow control of an energy harvesting operation at an apparatus in a discontinuous reception (DRX) mode. The apparatus in the DRX mode may reduce its power consumption and may immediately begin harvesting energy during an active time of a DRX cycle. The apparatus includes a memory and at least one processor coupled to the memory. The at least one processor is configured to enter a DRX mode and receive a control signal during an active time of the DRX mode. The control signal enables an energy harvesting operation at the apparatus. The at least one processor is further configured to perform the energy harvesting operation in response to the control signal, wherein the energy harvesting operation is performed based on at least one of a reported capability, a
(Continued)

preconfigured energy harvesting setting, control information in the control signal, or a combination thereof.

32 Claims, 27 Drawing Sheets

(58) Field of Classification Search
CPC ............. H04W 52/0296; H04W 76/28; H04W 52/0277; H02J 50/001; Y02D 30/70
See application file for complete search history.

(56) References Cited

U.S. PATENT DOCUMENTS

| 2023/0420987 | A1* | 12/2023 | Elshafie | ............ | H04W 52/0216 |
| 2024/0235787 | A1* | 7/2024 | Shubhi | .................. | H04L 5/0053 |
| 2025/0337507 | A1* | 10/2025 | Hwang | .................... | H04B 7/06 |
| 2025/0358648 | A1* | 11/2025 | Hwang | ................ | H04L 5/0048 |

OTHER PUBLICATIONS

Partial International Search Report—PCT/US2023/023396—ISA/EPO—Sep. 19, 2023.
International Search Report and Written Opinion—PCT/US2023/023396—ISA/EPO—Nov. 9, 2023.

* cited by examiner

198   Receive a control signal during an active time of a DRX mode and perform an energy harvesting operation in response to the control signal based on at least one of a reported capability, a preconfigured energy harvesting setting, control information in the control signal, or a combination thereof

802

804

805   Capability information

806   Assistance information

807   Configuration message

808   Enter DRX mode

810   Control signal

812   Power OFF at least one portion of an information receiver circuit during an active time of the DRX mode in response to the control signal 814   Perform an energy harvesting operation in response to the control signal based on at least one of a reported capability, a preconfigured energy harvesting setting, control information in the control signal, or a combination thereof 816   First signal 818   Second signal

DRX active time
900
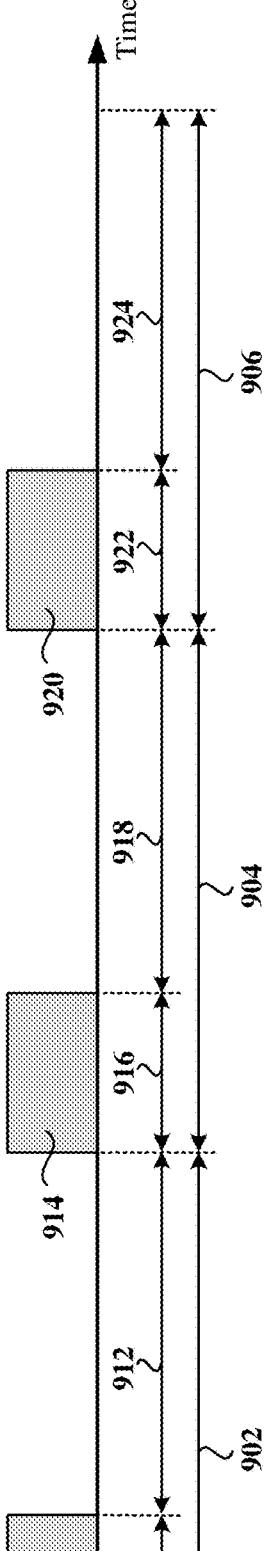
FIG. 9

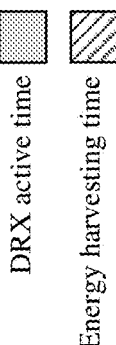
DRX active time
Energy harvesting time
FIG. 10

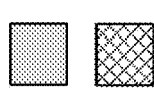
DRX active time
Energy harvesting time
using power splitting scheme
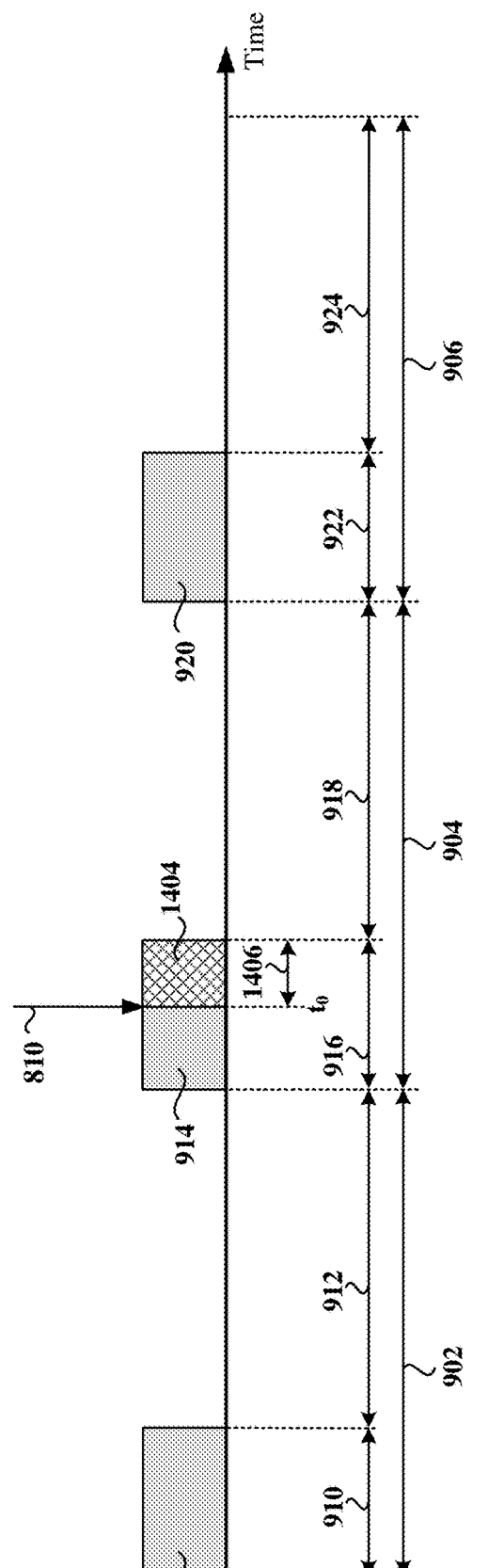
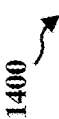
FIG. 14

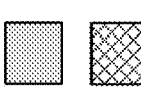
DRX active time
Energy harvesting time using power splitting scheme
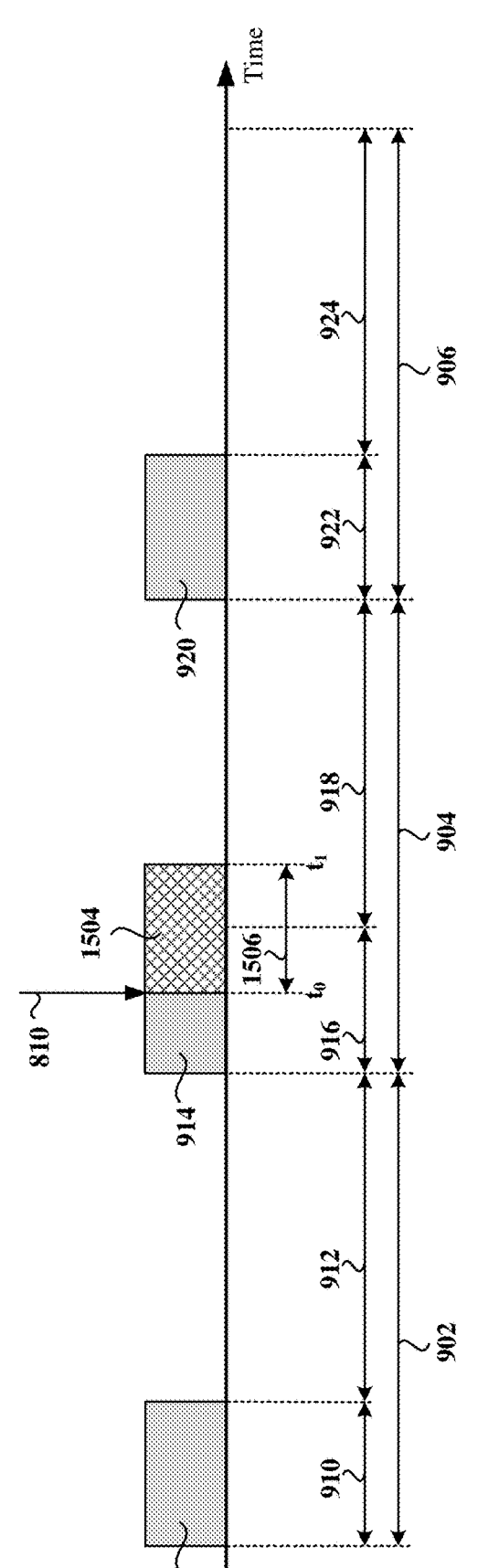
FIG. 15

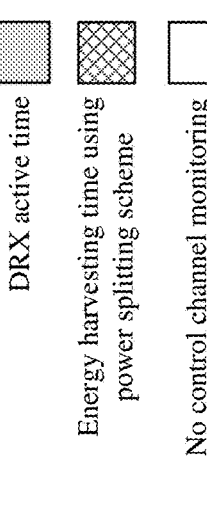
DRX active time
Energy harvesting time using power splitting scheme
No control channel monitoring
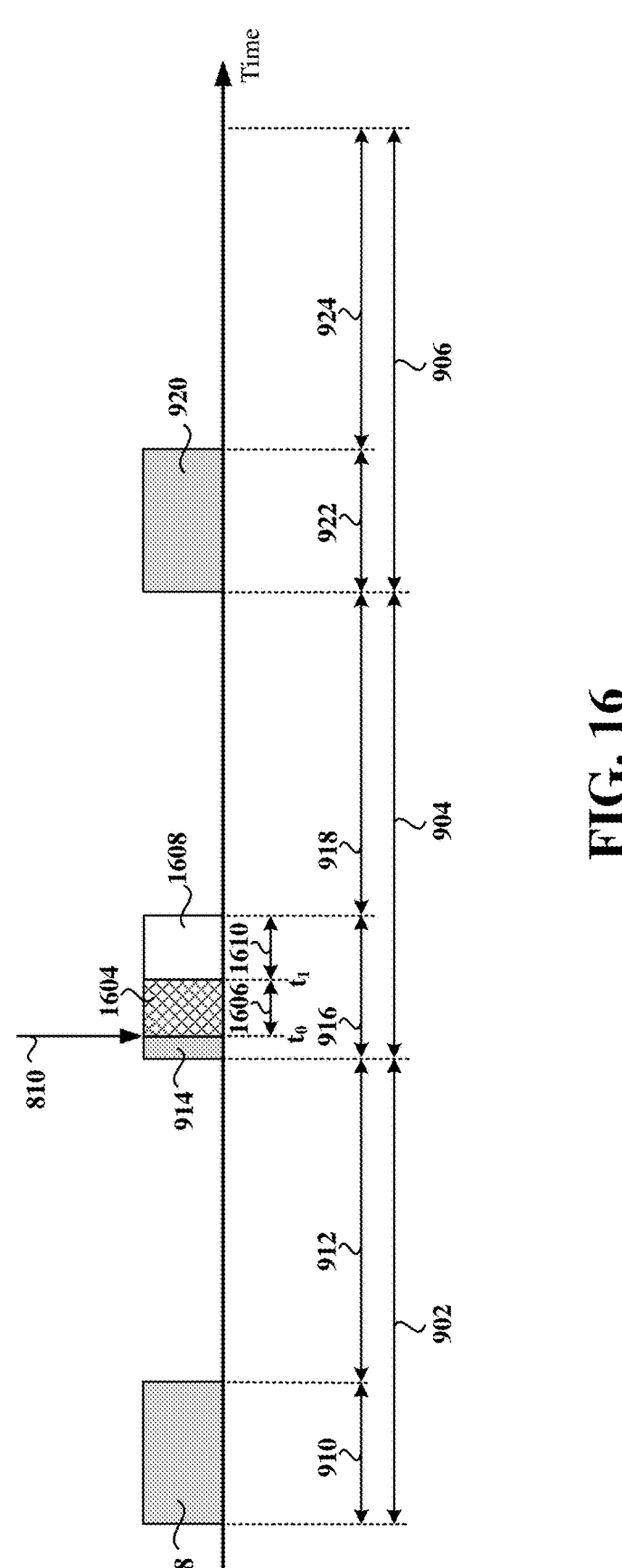
FIG. 16

 DRX active time
 Energy harvesting time using power splitting scheme with $\rho < 1$
Energy harvesting time using power splitting scheme with $\rho = 1$
Time
920
1708
1704
810
1706 1710
$t_1$
914 $t_0$ 916
924
922
918
916
912
910
906
904
902
908
1700
FIG. 17

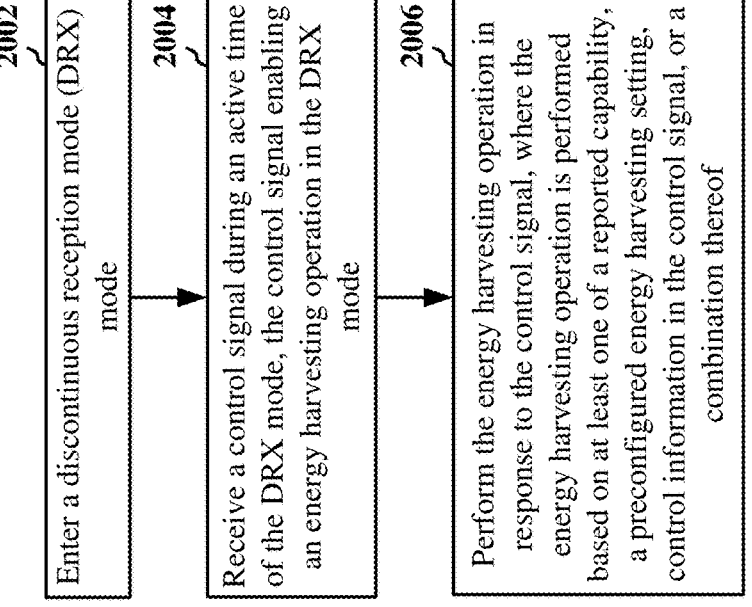

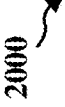

2000

2002

Enter a discontinuous reception mode (DRX) mode

2004

Receive a control signal during an active time of the DRX mode, the control signal enabling an energy harvesting operation in the DRX mode

2006

Perform the energy harvesting operation in response to the control signal, where the energy harvesting operation is performed based on at least one of a reported capability, a preconfigured energy harvesting setting, control information in the control signal, or a combination thereof

FIG. 20

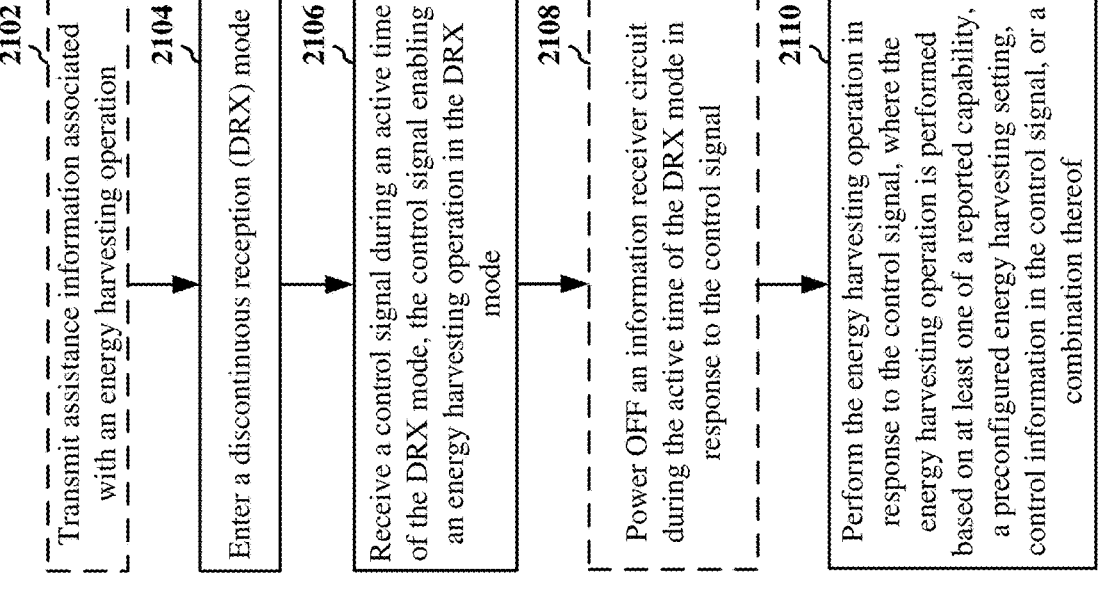

2102 Transmit assistance information associated with an energy harvesting operation 2104 Enter a discontinuous reception (DRX) mode 2106 Receive a control signal during an active time of the DRX mode, the control signal enabling an energy harvesting operation in the DRX mode 2108 Power OFF an information receiver circuit during the active time of the DRX mode in response to the control signal 2110 Perform the energy harvesting operation in response to the control signal, where the energy harvesting operation is performed based on at least one of a reported capability, a preconfigured energy harvesting setting, control information in the control signal, or a combination thereof

Transmit a configuration message associated with a discontinuous reception (DRX) mode of a user equipment (UE)

2404

Transmit a control signal during an active time of the DRX mode, the control signal enabling an energy harvesting operation at the UE in the DRX mode

2400

2500

2502

Transmit a configuration message associated with a discontinuous reception (DRX) mode of a user equipment (UE)

2504

Receive assistance information associated with an energy harvesting operation

2506

Transmit a control signal during an active time of the DRX mode, the control signal enabling an energy harvesting operation at the UE in the DRX mode

CONTROL OF ENERGY HARVESTING OPERATION IN A USER EQUIPMENT

BACKGROUND

Technical Field

The present disclosure relates generally to communication systems, and more particularly, to the control of an energy harvesting operation in a user equipment (UE).

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 50 New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

A user equipment (UE) may enter a discontinuous reception (DRX) mode to reduce the power consumption of the UE. The DRX mode may include one or more DRX cycles, where each DRX cycle includes a DRX active time. The UE 802 is expected to monitor a control channel (e.g., the PDCCH) during a DRX active time in a DRX cycle. In a remaining duration of each DRX cycle (e.g., a duration outside the DRX active time), the UE may not be expected to monitor the control channel. In some examples, the UE may power OFF one or more circuits associated with its receiver during the OFF duration to reduce power consumption.

The aspects described herein may allow control of an energy harvesting operation at a UE in the DRX mode. The aspects described herein may allow a UE in the DRX mode to further reduce its power consumption and immediately enable an energy harvesting device of the UE to begin harvesting energy during an active time of a DRX cycle.

In an aspect of the disclosure, a method, a computer-readable medium, and an apparatus are provided. The apparatus may be a user equipment (UE). The apparatus enters a discontinuous reception (DRX) mode and receives a control signal during an active time of the discontinuous reception mode, the control signal enabling an energy harvesting operation in the discontinuous reception mode. The apparatus performs the energy harvesting operation in response to the control signal, where the energy harvesting operation is performed based on at least one of a reported capability, a preconfigured energy harvesting setting, control information in the control signal, or a combination thereof.

In an aspect of the disclosure, a method, a computer-readable medium, and an apparatus are provided. The apparatus may be a base station. The apparatus transmits a configuration message associated with a discontinuous reception mode of a user equipment (UE). The apparatus transmits a control signal during an active time of the discontinuous reception mode, the control signal enabling an energy harvesting operation at the UE in the discontinuous reception mode.

In an aspect of the disclosure, the control signal contains control information that includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during an active time of the discontinuous reception mode, a second time-frequency resource to be used for the energy harvesting operation during an OFF cycle of the discontinuous reception mode, or a duration of an energy harvesting time for the energy harvesting operation.

In an aspect of the disclosure, the control signal includes an indication to skip monitoring of a control channel for at least a portion of an active time of the discontinuous reception mode.

In an aspect of the disclosure, the control signal is based on a first downlink control information format type different from a second downlink control information format type that includes an indication to skip monitoring of a control channel.

In an aspect of the disclosure, the control signal is based on a downlink control information format type that includes an indication to skip monitoring of a control channel.

In an aspect of the disclosure, the control signal indicates a power splitting scheme for the energy harvesting operation, and wherein the control information includes at least one of a power splitting factor for the power splitting scheme, a first duration for application of the power splitting scheme during an active time of the discontinuous reception mode when the power splitting factor is set to a value of less than one, a second duration for application of the power splitting scheme during the active time when the power splitting factor is set to one, a third duration over which the apparatus is to skip monitoring of a control channel during the active time, or a time-frequency resource to be used for the energy harvesting operation during an OFF cycle of the discontinuous reception mode.

In an aspect of the disclosure, the control signal includes first configuration information associated with a first energy harvesting scheme for the energy harvesting operation or second configuration information associated with a second energy harvesting scheme for the energy harvesting operation.

In an aspect of the disclosure, the control signal is associated with a first identifier when the control signal indicates first configuration information associated with a first energy harvesting scheme or second configuration information associated with a second energy harvesting scheme.

In an aspect of the disclosure, the control information includes a bit value in an energy harvesting control field, wherein the bit value enables the energy harvesting operation.

In an aspect of the disclosure, the apparatus receives assistance information associated with the energy harvesting operation, wherein at least a portion of control information in the control signal is based on the assistance information.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 8 illustrates a signal flow diagram in accordance with various aspects of the disclosure.

FIG. 9 is a diagram illustrating multiple discontinuous reception (DRX) cycles of a DRX mode.

FIG. 10 is a diagram illustrating a scenario where the UE receives the control signal during a DRX active time in one of the multiple DRX cycles of the DRX mode in accordance with various aspects of the disclosure.

FIG. 14 is a diagram illustrating a scenario where the UE receives the control signal during a DRX active time in one of the multiple DRX cycles of the DRX mode in accordance with various aspects of the disclosure.

FIG. 15 is a diagram illustrating a scenario where the UE receives the control signal during a DRX active time in one of the multiple DRX cycles of the DRX mode in accordance with various aspects of the disclosure.

FIG. 16 is a diagram illustrating a scenario where the UE receives the control signal during a DRX active time in one of the multiple DRX cycles of the DRX mode in accordance with various aspects of the disclosure.

FIG. 17 is a diagram illustrating a scenario where the UE receives the control signal during a DRX active time in one of the multiple DRX cycles of the DRX mode in accordance with various aspects of the disclosure.

FIG. 20 is a flowchart of a method of wireless communication.

FIG. 21 is a flowchart of a method of wireless communication.

DETAILED DESCRIPTION

Figure 1:
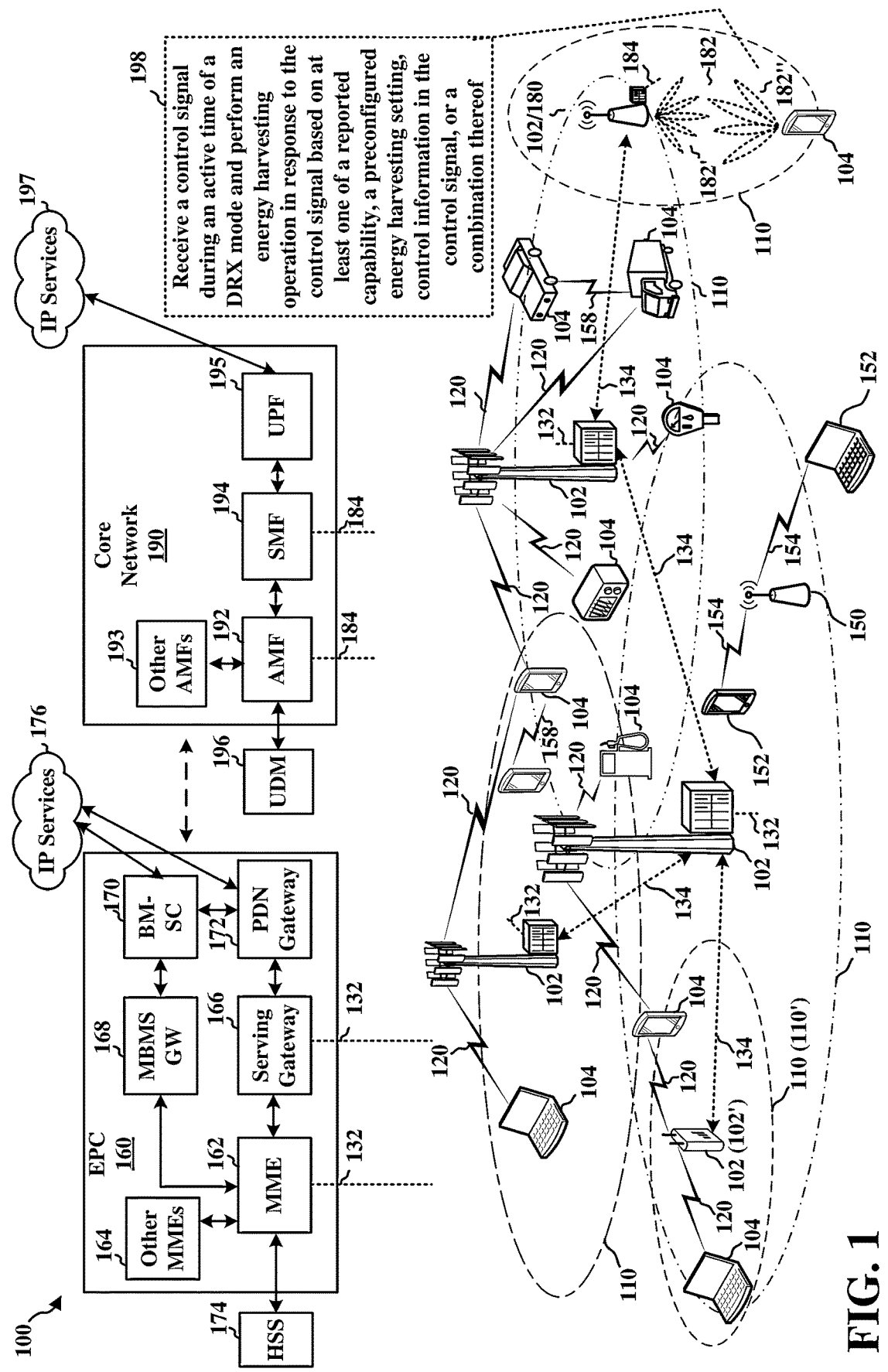
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102. UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the radio frequency (RF) in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of LUEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to receive a control signal during an active time of a discontinuous reception (DRX) mode and perform an energy harvesting operation in response to the control signal based on at least one of a reported capability, a preconfigured energy harvesting setting, control information in the control signal, or a combination thereof (198). Although the following description may be focused on 5G NR, the concepts described herein may be applicable to other similar areas, such as LTE, LTE-A, CDMA, GSM, and other wireless technologies.

Figures 2A, 2B, 2C, 2D:
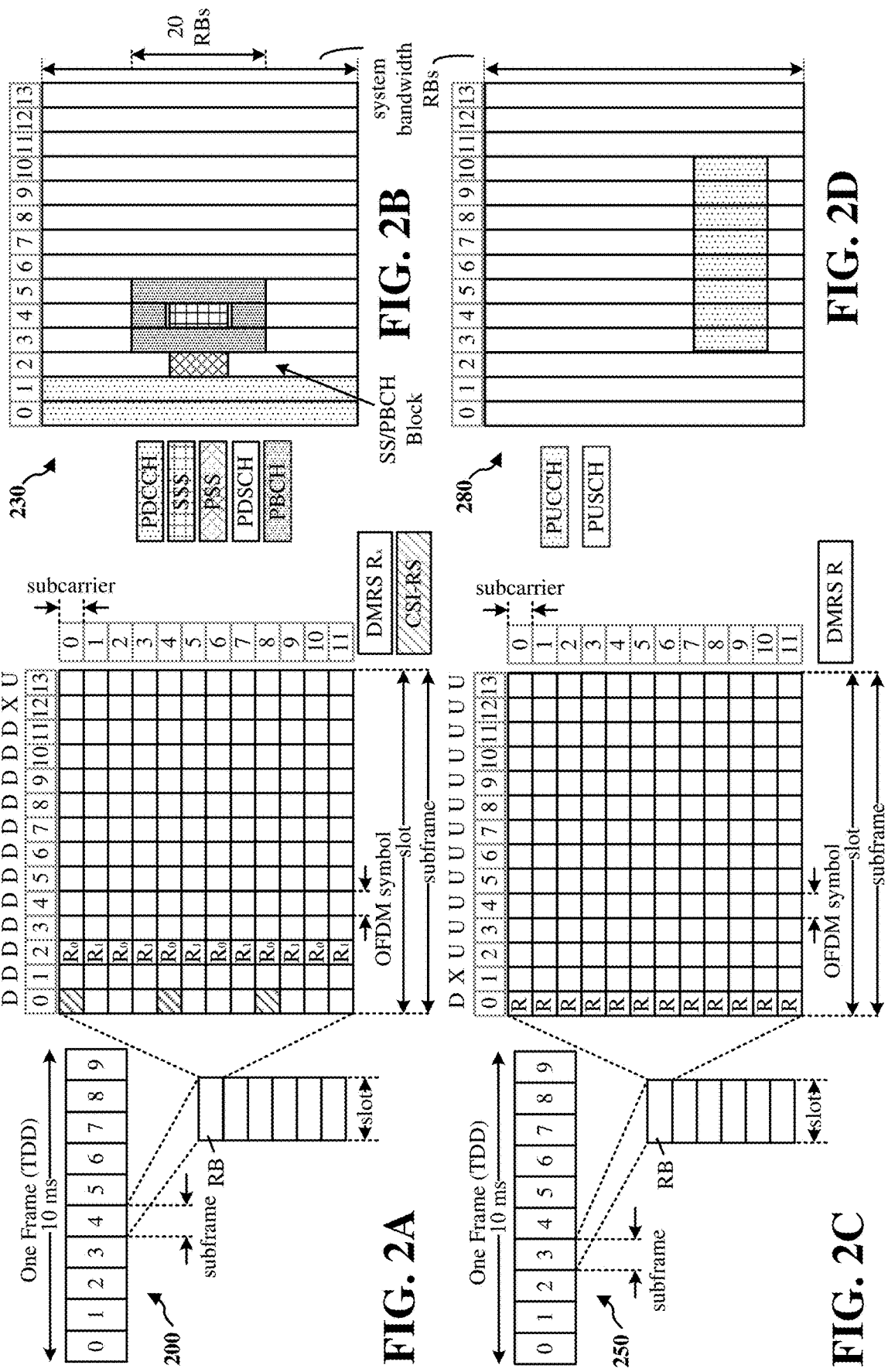
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SF1). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^\mu$ slots/subframe. The subcarrier spacing and symbol length/duration are a function of the numerology. The subcarrier spacing may be equal to $2^\mu*15$ kKz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100× is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
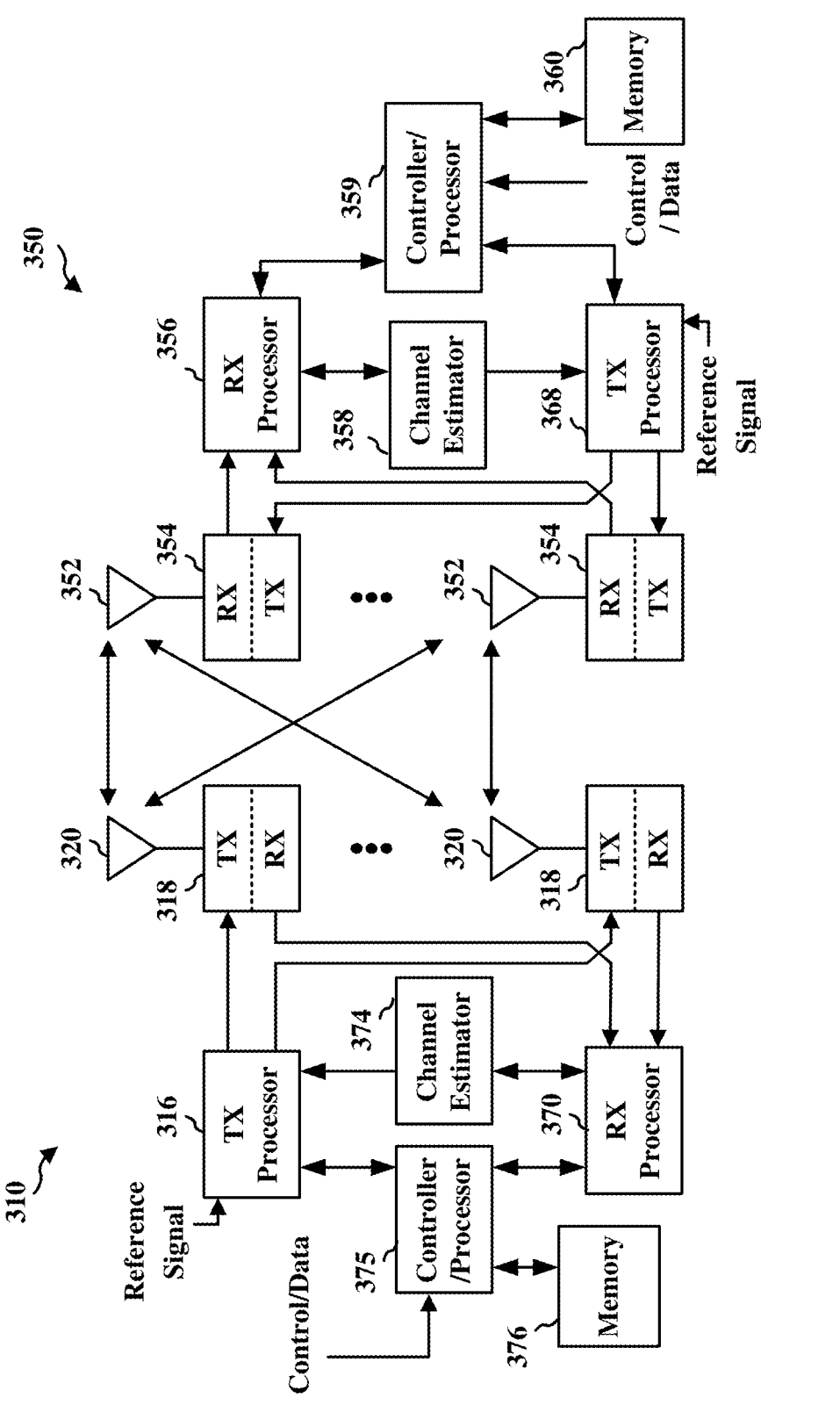
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 of FIG. 1.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU. DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 4:
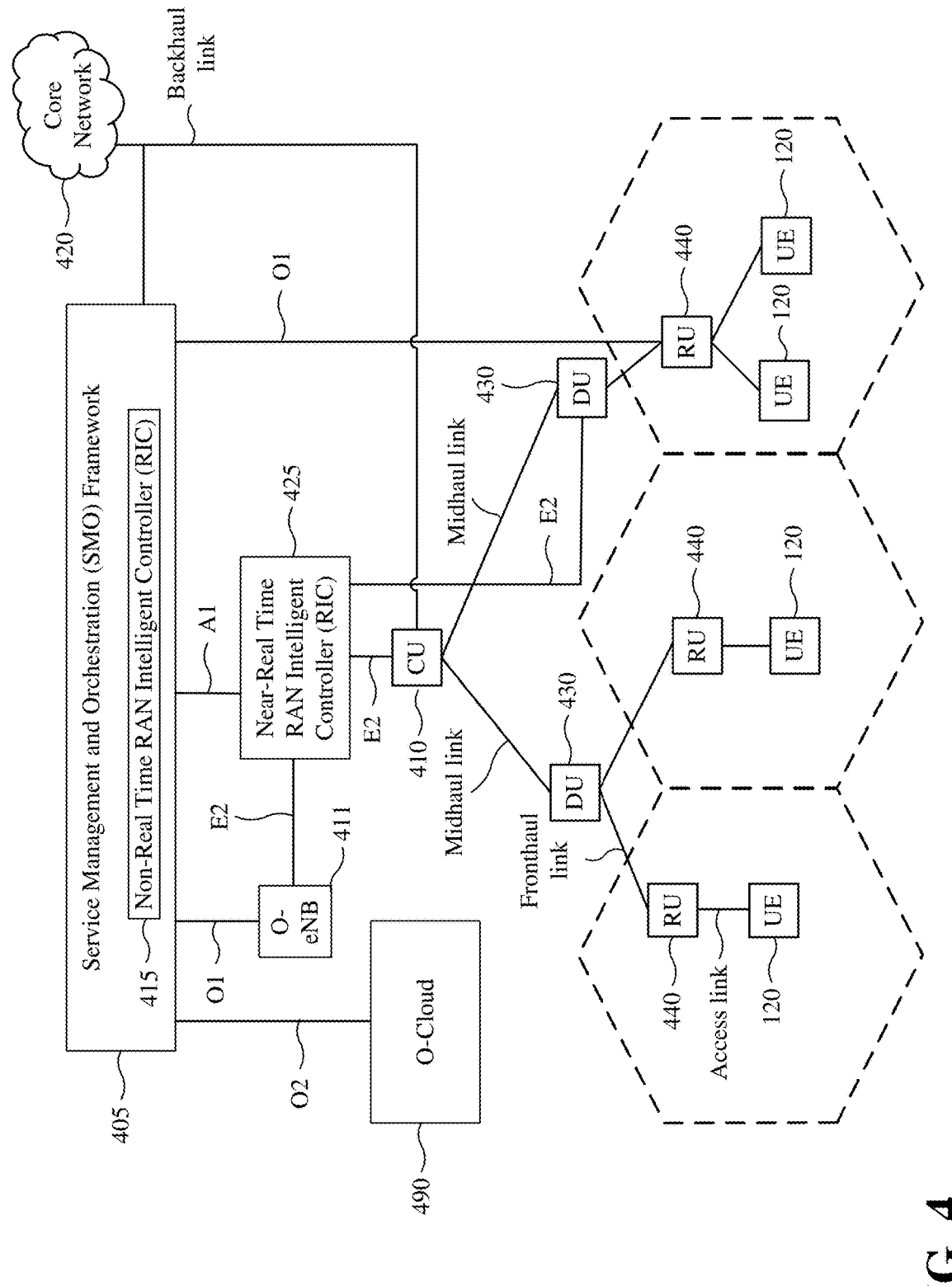
FIG. 4 shows a diagram illustrating an example disaggregated base station architecture.

FIG. 4 shows a diagram illustrating an example disaggregated base station 400 architecture. The disaggregated base station 400 architecture may include one or more central units (CUs) 410 that can communicate directly with a core network 420 via a backhaul link, or indirectly with the core network 420 through one or more disaggregated base station units (such as a Near-Real Time (Near-RT) RAN Intelligent Controller (RIC) 425 via an E2 link, or a Non-Real Time (Non-RT) RIC 415 associated with a Service Management and Orchestration (SMO) Framework 405, or both). A CU 410 may communicate with one or more distributed units (DUs) 430 via respective midhaul links, such as an F1 interface. The DUs 430 may communicate with one or more radio units (RUs) 440 via respective fronthaul links. The RUs 440 may communicate with respective UEs 120 via one or more radio frequency (RF) access links. In some implementations, the UE 120 may be simultaneously served by multiple RUs 440.

Each of the units, i.e., the CUs 410, the DUs 430, the RUs 440, as well as the Near-RT RICs 425, the Non-RT RICs 415 and the SMO Framework 405, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 410 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 410. The CU 410 may be configured to handle user plane functionality (i.e., Central Unit-User Plane (CU-UP)), control plane functionality (i.e., Central Unit-Control Plane (CU-CP)), or a combination thereof. In some implementations, the CU 410 can be logically split into one or more CU-UP units and one or more CU-CP units. The CU-UP unit can communicate bidirectionally with the CU-CP unit via an interface, such as the E1 interface when implemented in an O-RAN configuration. The CU 410 can be implemented to communicate with the DU 430, as necessary, for network control and signaling.

The DU 430 may correspond to a logical unit that includes one or more base station functions to control the operation of one or more RUs 440. In some aspects, the DU 430 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3rd Generation Partnership Project (3GPP). In some aspects, the DU 430 may further host one or more low PHY layers. Each layer (or module) can be implemented with an interface configured to communicate signals with other layers (and modules) hosted by the DU 430, or with the control functions hosted by the CU 410.

Lower-layer functionality can be implemented by one or more RUs 440. In some deployments, an RU 440, controlled by a DU 430, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 440 can be implemented to handle over the air (OTA) communication with one or more UEs 120. In some implementations, real-time and non-real-time aspects of control and user plane communication with the RU(s) 440 can be controlled by the corresponding DU 430. In some scenarios, this configuration can enable the DU(s) 430 and the CU 410 to be implemented in a cloud-based RAN architecture, such as a vRAN architecture.

The SMO Framework 405 may be configured to support RAN deployment and provisioning of non-virtualized and virtualized network elements. For non-virtualized network elements, the SMO Framework 405 may be configured to support the deployment of dedicated physical resources for RAN coverage requirements which may be managed via an operations and maintenance interface (such as an O1 interface). For virtualized network elements, the SMO Framework 405 may be configured to interact with a cloud computing platform (such as an open cloud (O-Cloud) 490) to perform network element life cycle management (such as to instantiate virtualized network elements) via a cloud computing platform interface (such as an O2 interface). Such virtualized network elements can include, but are not limited to, CUs 410, DUs 430, RUs 440 and Near-RT RICs 425. In some implementations, the SMO Framework 405 can communicate with a hardware aspect of a 4G RAN, such as an open eNB (O-eNB) 411, via an O1 interface. Additionally, in some implementations, the SMO Framework 405 can communicate directly with one or more RUs 440 via an O1 interface. The SMO Framework 405 also may include a Non-RT RIC 415 configured to support functionality of the SMO Framework 405.

The Non-RT RIC 415 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 425. The Non-RT RIC 415 may be coupled to or communicate with (such as via an A1 interface) the Near-RT RIC 425. The Near-RT RIC 425 may be configured to include a logical function that enables near-real-time control and optimization of RAN elements and resources via data collection and actions over an interface (such as via an E2 interface) connecting one or more CUs 410, one or more DUs 430, or both, as well as an O-eNB, with the Near-RT RIC 425.

In some implementations, to generate AI/ML models to be deployed in the Near-RT RIC 425, the Non-RT RIC 415 may receive parameters or external enrichment information from external servers. Such information may be utilized by the Near-RT RIC 425 and may be received at the SMO Framework 405 or the Non-RT RIC 415 from non-network data sources or from network functions. In some examples, the Non-RT RIC 415 or the Near-RT RIC 425 may be configured to tune RAN behavior or performance. For example, the Non-RT RIC 415 may monitor long-term trends and patterns for performance and employ AI/ML models to perform corrective actions through the SMO Framework 405 (such as reconfiguration via O1) or via creation of RAN management policies (such as A1 policies).

UEs, including premium UEs (e.g., smartphones) and reduced capability UEs (also referred to as RedCap UEs), may contain components that consume significant amounts of power. For example UEs may contain analog-to-digital converters (ADCs), mixers and oscillators, transmitters, etc. Such power consumption may rapidly reduce the power supply (e.g., battery) of a UE, which may impact the user experience. One approach to meet the power requirements in UEs is to equip UEs with an energy harvester circuit.

An energy harvester circuit may convert wireless signals (e.g., radio frequency (RF) signals) into electrical energy (e.g., direct current (DC) electrical energy). A UE may use the electrical energy to power the UE or may store the electrical energy for later use (e.g., by recharging a battery of the UE).

Often times, wireless signals for energy harvesting (EH) may be available intermittently and/or for short periods. A UE, however, may not be able to dynamically determine the most effective times to operate the energy harvester circuit to harvest energy using these wireless signals. Moreover, a UE may not have the information needed to maximize the amount of energy harvested from wireless signals, such as the time-frequency resources of the wireless signals.

Figure 5:
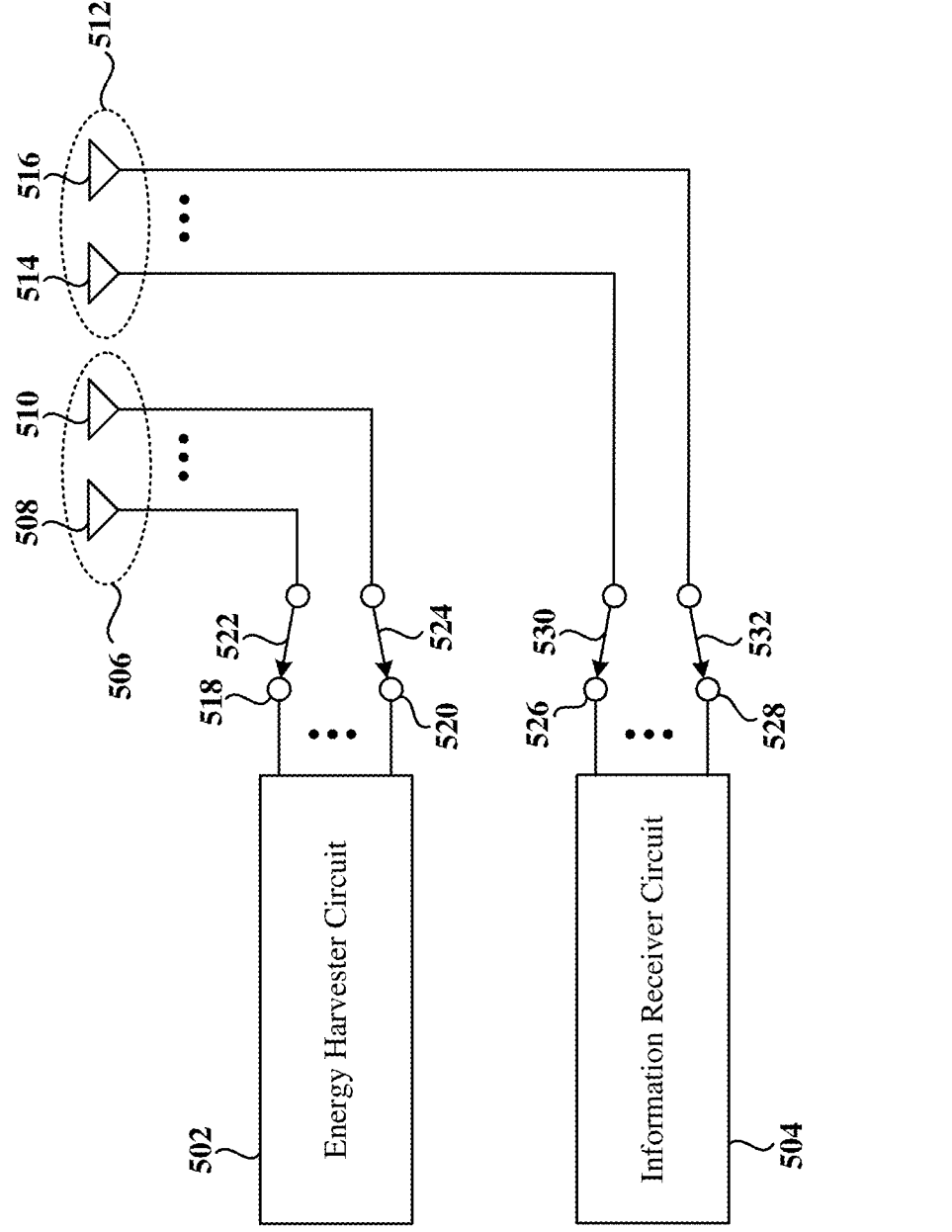
FIG. 5 illustrates a separated receiver architecture including an energy harvester circuit and an information receiver circuit.

FIG. 5 illustrates a separated receiver architecture 500 including an energy harvester circuit 502 and an information receiver circuit 504. For example, the energy harvester circuit 502 may be configured to convert a wireless signal (e.g., an RF signal) received at an antenna to electrical energy (e.g., DC electrical energy). In the separated receiver architecture 500, the energy harvester circuit 502 is coupled to a first set of antennas 506 dedicated for energy harvesting and the information receiver circuit 504 is coupled to a second set of antennas 512 dedicated for receiving information (e.g., for receiving wireless transmissions carrying user data and/or control information).

The first set of antennas 506 may include one or more antennas, such as a first antenna 508 and a second antenna 510. Each of the antennas in the first set of antennas 506 may be coupled to a different input of the energy harvester circuit 502 through a corresponding switch. For example, the first antenna 508 may be coupled to a first input 518 via a first switch 522, and the second antenna 510 may be coupled to a second input 520 via a second switch 524.

The second set of antennas 512 may include one or more antennas, such as a first antenna 514 and a second antenna 516. Each of the antennas in the second set of antennas 512 may be coupled to a different input of the information receiver circuit 504 through a corresponding switch. For example, the first antenna 514 may be coupled to a first input 526 via a first switch 530, and the second antenna 516 may be coupled to a second input 528 via a second switch 532.

The separated receiver architecture 500 enables concurrent energy harvesting and information reception. In some examples, the first set of antennas 506 may allow the energy harvester circuit 502 to use wireless communication channels for energy harvesting that are different from wireless communication channels used for receiving information.

Figure 6:
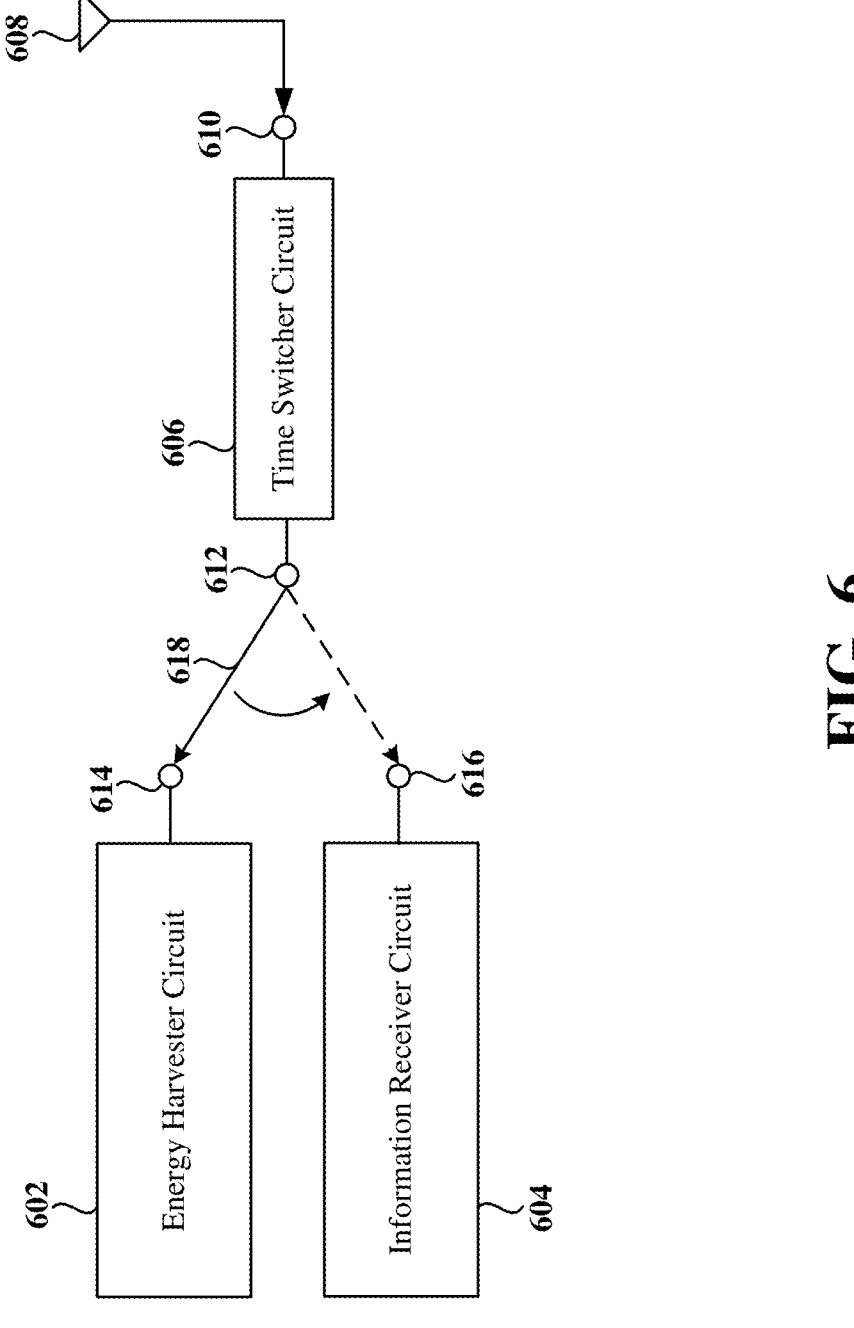
FIG. 6 illustrates a time-switching receiver architecture for harvesting energy at a UE based on a time-switching scheme.

FIG. 6 illustrates a time-switching receiver architecture 600 for harvesting energy at a UE based on a time-switching scheme. The time-switching receiver architecture 600 includes an energy harvester circuit 602, an information receiver circuit 604, and a time-switcher circuit 606. For example, the energy harvester circuit 602 may be configured to convert a wireless signal (e.g., an RF signal) received at an antenna to electrical energy (e.g., DC electrical energy). The information receiver circuit 604 may include an information decoder circuit, such as a baseband modem.

In the time-switching receiver architecture 600, an antenna 608 is coupled to an input 610 of the time-switcher circuit 606. An output of the time-switcher circuit 606 may be coupled to either an input 614 of the energy harvester circuit 602 or an input 616 of the information receiver circuit 604 via a switch 618. In some examples, the time-switcher circuit 606 may be configured to transfer a wireless signal received at the antenna 608 to either the energy harvester circuit 602 or the information receiver circuit 604. Therefore, in the time-switching receiver architecture 600, the antenna 608 is shared between the energy harvester circuit 602 and the information receiver circuit 604, such that either energy harvesting or information reception can be performed at a given time.

In some example implementations, the time-switching receiver architecture 600 may be included in a UE (e.g., the UE 104, 802). The UE may switch between the information receiver circuit 604 and the energy harvester circuit 602. An amount of the energy harvested at the energy harvester circuit 602 may be determined based on the following equation:

$$E_j = \eta P_i |g_{i\text{-}j}|^2(\alpha T) \qquad \text{(equation 1)}$$

where $E_j$ represents the energy harvested at a receiver j, $\eta$ is a coefficient that represents an energy conversion efficiency of the energy harvester circuit 602. $P_i$ represents the transmit power of a wireless signal from a source i to be used for energy harvesting, $g_{i\text{-}j}$ represents a channel gain between the source i and receiver j (e.g., a gain of a propagation channel of the wireless signal to be used for energy harvesting), T represents a time period, and a is a value representing a portion of the time period T allocated for energy harvesting. In equation (1), the product of $P_i$ and $|g_{i\text{-}j}|^2$ may represent the power of a wireless signal received at the antenna 608.

The value of $\alpha$ may be defined as $0 \leq \alpha \leq 1$. Therefore, the time-switcher circuit 606 may allocate a period $\alpha$T to energy harvesting and a period $(1-\alpha)$T to information reception. For example, if $\alpha=0.2$ and T=10 seconds, the time-switcher circuit 606 may allocate 2 seconds (e.g., $\alpha$T=(0.2)(10)=2 seconds) in a period of 10 seconds to energy harvesting by coupling the output 612 to the input 614 via the switch 618 for 2 seconds. In this example, the time-switcher circuit 606 may allocate 8 seconds (e.g., $(1-\alpha)$T=(1-0.2)(10)=8 seconds) in the period of 10 seconds to information reception by coupling the output 612 to the input 616 via the switch 618 for 8 seconds.

It should be noted that the switching of the switch 618 may momentarily disconnect the antenna 608 from both the energy harvester circuit 602 and the information receiver circuit 604. Therefore, depending on the speed of the switch 618, a time gap may be introduced between an end of an operation of one circuit (e.g., the energy harvester circuit 602 or the information receiver circuit 604) and a beginning of an operation of another circuit (e.g., the energy harvester circuit 602 or the information receiver circuit 604).

The value of $\eta$ may be expressed as a percentage value (e.g., in decimal form) and may indicate the output to input ratio of the energy harvester circuit 602. In some examples, the value of $\eta$ may depend on the characteristics and operating conditions (e.g., temperature) of the energy harvester circuit 602. For example, if the efficiency of the energy harvester circuit 602 for converting wireless signals to electrical energy (e.g., DC electrical energy) under certain conditions is 50%, the value of $\eta$ in equation (1) may be set to 0.5.

In a bandwidth-limited case, the data rate of an information receiver circuit (e.g., the information receiver circuit 604) may be determined based on the following equation:

$$R = \log_2(1+\text{SNR}) \qquad \text{(equation 2)}$$

where R represents the data rate (e.g., in terms of bits per coding unit) that can be achieved by the information receiver circuit, and SNR represents the signal-to-noise ratio of a wireless signal received at the information receiver circuit.

As previously discussed, the time-switcher circuit 606 may allocate a period $(1-\alpha)$T for information reception at the information receiver circuit 604. This may impact the data rate of the information receiver circuit 604. For example, the data rate of the information receiver circuit 604 may be determined based on the following equation:

$$R = (1-\alpha)\log_2(1+\text{SNR}) \qquad \text{(equation 3)}$$

where the SNR may be expressed as a ratio of a signal power (e.g., a power of a wireless signal received at the antenna 608) to a noise power. As previously described, the product of $P_i$ and $|g_{i\text{-}j}|^2$ in equation (1) may represent the power of a wireless signal received at the antenna 608. The total noise power may be expressed as the product of a noise spectral density $\kappa$ and the bandwidth W of a channel. Accordingly, in one example, the SNR may be expressed $$\frac{|g_{i\text{-}j}|^2 P_i}{\kappa W}.$$

Therefore, the SNR in equation (3) may be replaced with the expression $$\frac{|g_{i\text{-}j}|^2 P_i}{\kappa W}$$

to provide the following equation:

$$R_{i\text{-}j} = (1-\alpha)\log_2\left(1 + \frac{|g_{i\text{-}j}|^2 P_i}{\kappa W}\right) \qquad \text{(equation 4)}$$

where $R_{i\text{-}j}$ represents the data rate (e.g., in terms of bits per coding unit) for a wireless transmission received at a receiver j from a source i, $\alpha$ is defined as $0 \leq \alpha \leq 1$ as previously described with reference to equation (1). $\kappa$ represents the noise spectral density, and W represents the bandwidth of a channel (e.g., a frequency value). In some examples, the value of $\kappa$ may indicate the noise power in a 1 hertz (Hz) bandwidth and may be measured in watts per hertz.

Figure 7:
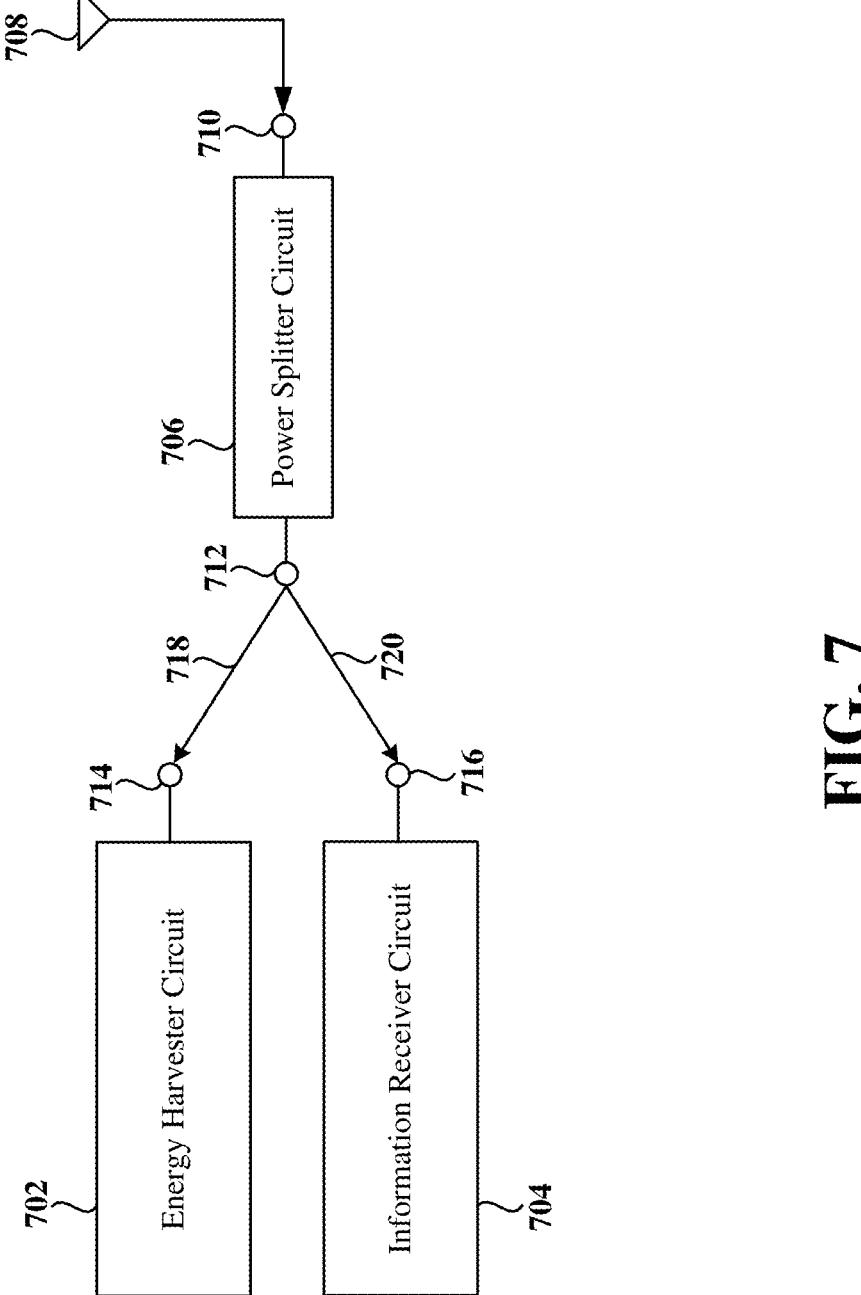
FIG. 7 illustrates a power-splitting receiver architecture including an energy harvester circuit, an information receiver circuit, and a power splitter circuit.

FIG. 7 illustrates a power-splitting receiver architecture 700 including an energy harvester circuit 702, an information receiver circuit 704, and a power splitter circuit 706. For example, the energy harvester circuit 702 may be configured to convert at least a portion of a wireless signal (e.g., an RF signal) received at an antenna to electrical energy (e.g., DC electrical energy). The information receiver circuit 704 may include an information decoder circuit, such as a baseband modem.

In the power-splitting receiver architecture 700, an antenna 708 may be coupled to an input 710 of the power splitter circuit 706. An output of the power splitter circuit 706 may be coupled to an input 714 of the energy harvester circuit 702 and an input 716 of the information receiver circuit 704 via transmission paths 718, 720.

The power splitter circuit 706 may split a wireless signal (e.g., an RF signal) received at the antenna 708 into two signal streams. For example, the power splitter circuit 706 may provide a first signal stream to the energy harvester circuit 702 and may provide a second signal stream to the information receiver circuit 704. In some examples, the two signal streams may have different power levels. For example, the first signal stream may have a first power level and the second signal stream may have a second power level. In some examples, the first power level may be different from the second power level. Therefore, the power-splitting receiver architecture 700 may concurrently perform energy harvesting and information reception.

In some example implementations, the power-splitting receiver architecture 700 may be included in a UE (e.g., the UE 104, 802) and may allow the UE to concurrently perform energy harvesting and information reception. The amount of energy harvested at the energy harvester circuit 702 may be determined based on the following equation:

$$E_j = \eta \rho P_i |g_{i\text{-}j}|^2 T \qquad \text{(equation 5)}$$

where $E_j$ represents the energy harvested at a receiver j, $\eta$ is a coefficient that represents an energy conversion efficiency of the energy harvester circuit 702, $P_i$ represents the transmit power of a wireless signal from a source i to be used for energy harvesting, $g_{i\text{-}j}$ represents a channel gain between the source i and receiver j (e.g., a gain of a propagation channel of the wireless signal to be used for energy harvesting), T represents a time period, and $\rho$ is a value representing a power splitting factor. In equation (5), the product of $P_i$ and $|g_{i\text{-}j}|^2$ in equation (5) may represent the power of a wireless signal received at the antenna 708.

The value of $\rho$ may be defined as $0 \leq \rho \leq 1$. Therefore, the power splitter circuit 706 may transfer a portion of a power of a wireless signal received at the antenna 708 to the input 714 of the energy harvester circuit 702 and may transfer a remaining portion of the power of the wireless signal received at the antenna 708 to the input 716 of the information receiver circuit 704.

In some examples, the power splitter circuit 706 may apply different values of $\rho$ by implementing a resistor network, such as a resistive voltage divider network. For example, different nodes (e.g., outputs) of the resistor network in the power splitter circuit 706 may be configured to apply different values of $\rho$, such as 0.25, 0.5, and 0.75. It should be understood that other values of $\rho$ may be achieved based on the design of the resistor network (e.g., the number of resistors and nodes used in the resistor network, the values of the resistors in the resistor network, etc.).

In one example, if $\rho = 0.25$, the power splitter circuit 706 may split a wireless signal received at the antenna 708 into two signal streams, where a first signal stream having 25% of the power of the wireless signal received at the antenna 708 is provided to the input 714 of the energy harvester circuit 702 and a second signal stream having 75% of the power of the wireless signal received at the antenna 708 is provided to the input 716 of the information receiver circuit 704.

In another example, if $\rho = 1$, the power splitter circuit 706 may transfer the wireless signal received at the antenna 708 to the input 714 of the energy harvester circuit 702 and may not transfer any part of the wireless signal received at the antenna 708 to the input 716 of the information receiver circuit 704. In yet another example, if $\rho = 0$, the power splitter circuit 706 may transfer the wireless signal received at the antenna 708 to the input 716 of the information receiver circuit 704 and may not transfer any part of the wireless signal received at the antenna 708 to the input 714 of the energy harvester circuit 702.

The value of $\eta$ may be expressed as a percentage value (e.g., in decimal form) and may indicate the output to input ratio of the energy harvester circuit 702. In some examples, the value of $\eta$ may depend on the characteristics and operating conditions (e.g., temperature) of the energy harvester circuit 702. For example, if the efficiency of the energy harvester circuit 702 for converting wireless signals to electrical energy (e.g., DC electrical energy) under certain conditions is 50%, the value of $\eta$ in equation (1) may be set to 0.5.

As previously discussed, in a bandwidth-limited case, the data rate of an information receiver may be determined based on equation (2). As also previously discussed, the power splitter circuit 706 may split a wireless signal received at the antenna 708 into two streams for the energy harvester circuit 702 and the information receiver circuit 704. In some examples, the two streams may have different power levels based on the power splitting factor $\rho$ applied at the power splitter circuit 706. This may impact the data rate of the information receiver circuit 704. For example, the data rate of the information receiver circuit 704 may be determined based on the following equation:

$$R = \log_2(1 + (1-\rho) \cdot \text{SNR}) \quad \text{(equation 6)}$$

where the SNR may be expressed as a ratio of a signal power (e.g., a power of a wireless signal received at the antenna 708) to a noise power.

As previously described, the product of $P_i$ and $|g_{i-j}|^2$ in equation (5) may represent the power of a wireless signal received at the antenna 708. The total noise power may be expressed as the product of a noise spectral density $\kappa$ and the bandwidth of a channel. Accordingly, in one example, the SNR may be expressed as $$\frac{|g_{i-j}|^2 P_i}{\kappa W}.$$

Therefore, the SNR in equation (6) may be replaced with the expression $$\frac{|g_{i-j}|^2 P_i}{\kappa W}$$

to provide the following equation:

$$R_{i-j} = \log_2 \left( 1 + (1-\rho) \cdot \frac{|g_{i-j}|^2 P_i}{\kappa W} \right) \quad \text{(equation 7)}$$

where $R_{i-j}$ represents the data rate (e.g., in terms of bits per coding unit), $\rho$ is a value defined as $0 \leq \rho - 1$ as previously described with reference to equation (5). $\kappa$ represents the noise spectral density, and W represents the bandwidth of a channel (e.g., a frequency value). In some examples, the value of $\kappa$ may indicate the noise power in a 1 Hz bandwidth and may be measured in watts per hertz. In equation (6) and equation (7), it should be noted that the expression $1-\rho$ may effectively reduce the SNR.

In a low-SNR regime, a received signal power is considered to be low relative to noise, such that the SNR is close to zero. Considering that the expression $\log(1+u)$ is approximately equal to u when the value of u is close to zero, equation (4) may be reduced to $$R_{i-j} = (1-\alpha) \cdot \frac{|g_{i-j}|^2 P_i}{\kappa W}$$

and equation (7) may be reduced to $$R_{i-j} = (1-\rho) \cdot \frac{|g_{i-j}|^2 P_i}{\kappa W}$$

when the result of the expression $$\frac{|g_{i-j}|^2 P_i}{\kappa W}$$

is close to zero. Therefore, when $\alpha = \rho$ in scenarios where the SNR is low, the data rate $R_{i-j}$ of the time-switching receiver architecture 600 may be equal to the data rate $R_{i-j}$ of the power-splitting receiver architecture 700.

In a high-SNR regime, a received signal power is considered to be high relative to noise, such that the SNR is greater than one. When the SNR is high, equation (4) may be reduced to $R_{i-j} = \log_2((1-\alpha)\gamma)$ and the data rate $R_{i-j}$ in equation (7) may be expressed as the inequality $\log_2((1-\rho)\gamma) \geq^{Jen} (1-\rho)\log_2(\gamma)$, where $$\gamma = \frac{|g_{i-j}|^2 P_i}{\kappa W}.$$

It should be noted that when $\alpha=\rho$, the impact of the expression $1-\alpha$ in equation (4) may be more significant than the log arguments in equations (4) and (7).

It should be noted that the amount of energy harvested using the time-switching receiver architecture 600 (e.g., $E_j$ in equation (1)) may equal the amount of energy harvested using the power-splitting receiver architecture 700 (e.g., $E_j$ in equation (4)) when $\alpha=\rho$ in both the low-SNR regime and the high-SNR regime.

FIG. 8 illustrates a signal flow diagram 800 in accordance with various aspects of the disclosure. The signal flow diagram 800 includes a UE 802 and a base station 804.

In some aspects of the disclosure, the UE 802 may transmit capability information 805 to report one or more capabilities of the UE 802. In some aspects, the UE 802 may transmit the capability information 805 in a UE capability information message (also referred to as a UECapabilityInformation message) in response to UE capability enquiry message (also referred to as a UECapabilityEnquiry message) from the base station 804.

The capability information 805 may indicate an energy harvesting architecture (e.g., the separated receiver architecture 500, the time-switching receiver architecture 600, the power-splitting receiver architecture 700) supported by the UE 802. For example, the capability information 805 may include an energy harvesting class (also referred to as an energy harvesting type) of the UE 802, where the energy harvesting class is associated with a separated receiver architecture (e.g., the separated receiver architecture 500), a time-switching receiver architecture (e.g., the time-switching receiver architecture 600), a power-splitting receiver architecture 700 (e.g., the power-splitting receiver architecture 700), or other suitable energy harvesting architecture.

In some aspects, each energy harvesting class may be associated with a set of energy harvesting configuration parameters. For example, a first energy harvesting class may be associated with a first set of energy harvesting configuration parameters and a second energy harvesting class may be associated with a second set of energy harvesting configuration parameters. The base station 804 may know the set of energy harvesting configuration parameters associated with each energy harvesting class.

In some examples, the UE 802 may transmit the capability information 805 during an initial access procedure, such as random access channel (RACH) procedure. For example, the capability information 805 may be included in a first message (Msg1) or a third message (Msg3) of 4-step RACH procedure, or in a first message (MsgA) of 2-step RACH procedure. In some examples, the capability information 805 may be included in user assistance information (e.g., in an RRC message). In some examples, the UE 802 may indicate the capability information 805 to the base station 804 or a transmission device using layer 1, layer 2, or layer 3 signaling.

In some aspects, a capability of the UE 802 indicated in the capability information 805 may be for a certain band, bandwidth part (BWP) or component carrier (CC). In some aspects, a capability of the UE 802 indicated in the capability information 805 may be for any combination of a band, a BWP, and a CC.

In some aspects of the disclosure, the UE 802 may optionally transmit assistance information 806 to the base station 804. As described herein, the assistance information 806 may include a value suggested by the UE 802 for at least one operating parameter of the UE 802. For example, the assistance information 806 may include a suggested value for a power splitting factor for an energy harvesting operation based on a power splitting scheme. In some aspects, the UE 802 may suggest higher values for the power splitting factor (e.g., a value greater than 0.5) if a battery level of the UE 802 is below a threshold and may suggest lower values for the power splitting factor (e.g., a value less than or equal to 0.5) if a battery level of the UE 802 is above the threshold.

The UE 802 may receive a configuration message 807 from the base station 804. In some examples, the configuration message 807 may be a layer 2 or layer 3 message, such as a radio resource control (RRC) message or a MAC-control element (MAC-CE) message. In some examples, the configuration message 807 may be associated with a discontinuous reception (DRX) mode of a UE. For example, the configuration message 807 may indicate at least one duration for a DRX cycle, at least one duration for a DRX active time of the DRX cycle, a duration for an inactivity timer, and/or other suitable information for configuring a DRX mode of a UE.

At 808, the UE 802 may enter a DRX mode. The DRX mode may reduce the power consumption of the UE 802. The DRX mode may include one or more DRX cycles, where each DRX cycle includes a DRX active time. In the aspects described herein, a DRX active time in a DRX cycle may also be referred to as an active time, an ON time, or an ON cycle of the DRX mode.

The UE 802 is expected to monitor a control channel (e.g., the PDCCH) during a DRX active time in a DRX cycle. In a remaining duration of each DRX cycle (e.g., a duration outside of the DRX active time, referred to as an OFF duration, an OFF time or an OFF cycle of the DRX mode), the UE 802 may not be expected to monitor the control channel. In some examples, the UE 802 may power OFF one or more circuits associated with its receiver during the OFF duration to reduce power consumption. An example of the DRX mode including multiple DRX cycles will now be described with reference to FIG. 9.

FIG. 9 is a diagram 900 illustrating multiple DRX cycles of a DRX mode. FIG. 9 includes a first DRX cycle duration 902, a second DRX cycle duration 904, and a third DRX cycle duration 906. A UE may be configured with a first DRX active time 908 in the first DRX cycle duration 902, a second DRX active time 914 in the second DRX cycle duration 904, and a third DRX active time 920 in the third DRX cycle duration 906. In some examples, the durations 910, 916, 922 of the first, second, and third DRX active times 908, 914, 920 may be the same.

In FIG. 9, the durations 912, 918, 924 outside of the first, second, and third DRX active times 908, 914, 920 may represent OFF cycles in the first, second, and third DRX cycle durations 902, 904, 906. In some examples, the UE 802 may power OFF an information receiver circuit (or a portion of the information receiver circuit) of the UE 802 during an OFF cycle to reduce power consumption. For example, the UE 802 may power OFF its information receiver circuit during the durations 912, 918, 924.

Referring back to FIG. 8, the UE 802 may receive a control signal 810. In some examples, the control signal 810 may be received during a DRX active time on a control channel (e.g., the PDCCH). In some aspects of the disclosure, and as described in detail herein, the control signal 810 may enable an energy harvesting operation at the UE 802 in the DRX mode.

At 812, the UE 802 optionally powers OFF at least one portion of an information receiver circuit of the UE 802 during a DRX active time of the DRX mode in response to the control signal 810. For example, the information receiver circuit of the UE 802 may include an RF front end, a baseband modem, and/or other components for receiving and decoding data (e.g., digital data) in a wireless signal. In some aspects, the UE 802 may power OFF at least one portion (e.g., the RF front end, a component of the RF front end, and/or the baseband modem) of its information receiver circuit by electrically disconnecting one or more portions of the information receiver circuit from a power source of the UE 802 or disabling operation of the at least one portion of the information receiver circuit.

At 814, the UE 802 performs an energy harvesting operation in response to the control signal 810 based on at least one of a reported capability (e.g., an energy harvesting class of the UE 802 indicated in the capability information 805), a preconfigured energy harvesting setting, control information in the control signal 810, or a combination thereof.

In some aspects, the control signal 810 includes control information (e.g., DCI) that may cause the UE 802 in the DRX mode to switch to an energy harvesting mode (also referred to as a wireless energy harvesting mode). In some examples, the control information in the control signal 810 is based on the capability information 805 from the UE. For example, the base station 804 providing the control information may be aware of the energy harvesting class of the UE 802 from the capability information 805 reported to the base station 804 and may include (e.g., in the control signal 810) energy harvesting configuration parameters and corresponding parameter values associated with that energy harvesting class.

In some aspects, the preconfigured energy harvesting setting may indicate one or more parameter values associated with an energy harvesting operation, such as a value for ρ if the UE 802 is capable of energy harvesting based on a power splitting scheme, a value for a if the UE 802 is capable of energy harvesting based on a time-switching scheme, and/or other suitable parameters associated with an energy harvesting operation as described herein. In some examples, the preconfigured energy harvesting setting may be preconfigured by specification, preconfigured via an RRC message prior to reception of the control signal 810, preconfigured via a MAC-CE message, or any combination thereof. In some examples, the preconfigured energy harvesting setting may be selected based on a UE status condition, an RRC pre-configuration, a specification defined pre-configuration, or combinations thereof.

In some examples, the UE 802 may be operating in a DRX active time of the DRX mode and the control signal 810 may cause the UE 802 to switch to an energy harvesting mode for all or part of the DRX active time. In some examples, the control signal 810 may cause the UE 802 to remain in the energy harvesting mode for at least a portion of an OFF cycle of the DRX mode or may cause the UE 802 to switch to the energy harvesting mode during an OFF cycle of the DRX mode.

In some examples, the control information in the control signal 810 may include an identifier of a component carrier for the energy harvesting operation, a bandwidth associated with the component carrier, quasi-colocation (QCL) information (e.g., at least one transmission configuration indicator (TCI) state) associated with an energy harvesting signal for the energy harvesting operation, a first time-frequency resource to be used for the energy harvesting operation during a DRX active time of the DRX mode, a second time-frequency resource to be used for the energy harvesting operation during an OFF cycle of the DRX mode extended from the DRX active time or during a period between the DRX active time and a next DRX active time, and/or a duration of an energy harvesting time for the energy harvesting operation.

Examples of the UE 802 receiving the control signal 810 to enable an energy harvesting operation in the DRX mode will now be described with reference to FIGS. 10-18. FIG. 10 is a diagram 1000 illustrating a scenario where the UE 802 receives the control signal 810 during a DRX active time in one of the multiple DRX cycles 902, 904, 906 of the DRX mode previously described with reference to FIG. 9.

In the example of FIG. 10, the control information in the control signal 810 may indicate to use a remaining portion of a DRX active time, such as the second DRX active time 914 of the second DRX cycle 904, for energy harvesting. Therefore, if the UE 802 receives the control signal 810 during the second DRX active time 914 at time $t_0$, the UE 802 may perform an energy harvesting operation for the remaining duration 1006 of the second DRX active time 914. In the example of FIG. 10, the remaining duration 1006 of the second DRX active time 914 may define an energy harvesting time 1004 for the UE 802.

Figure 11:
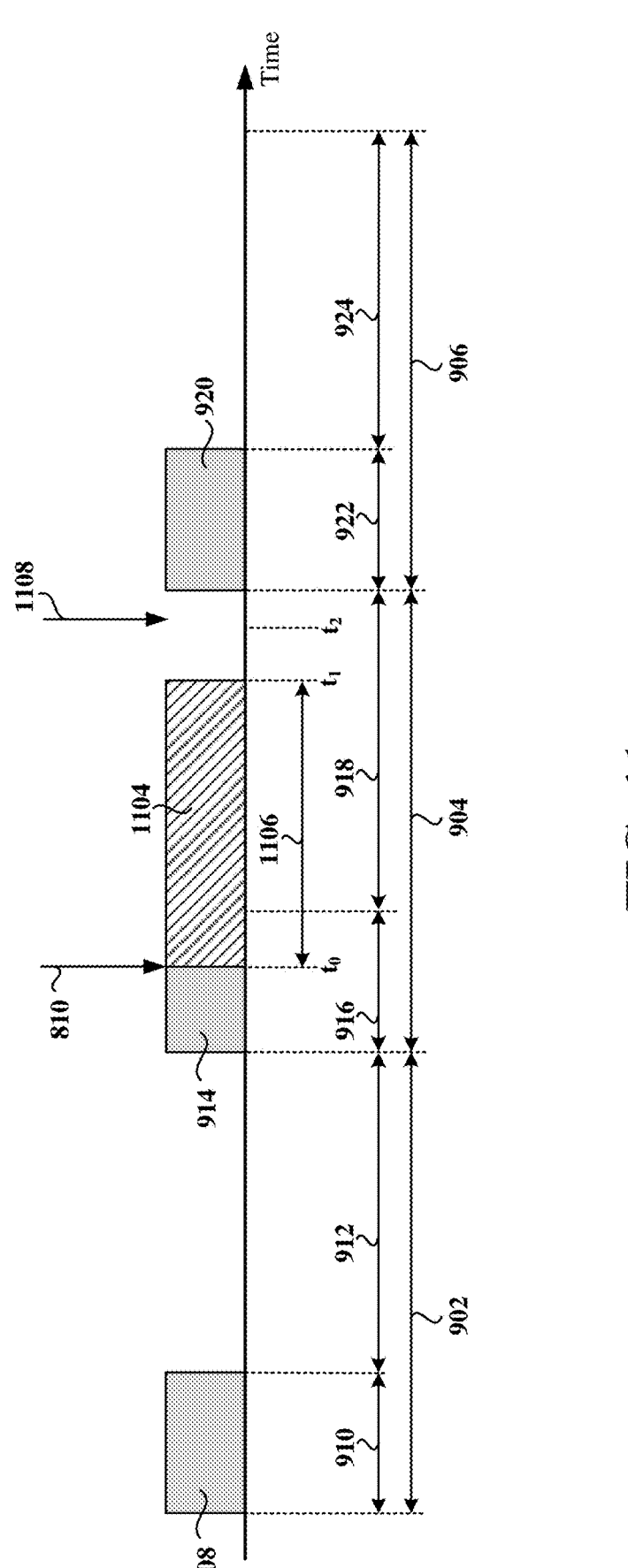
FIG. 11 is a diagram illustrating a scenario where the UE receives the control signal during a DRX active time in one of the multiple DRX cycles of the DRX mode in accordance with various aspects of the disclosure.

FIG. 11 is a diagram 1100 illustrating a scenario where the UE 802 receives the control signal 810 during a DRX active time in one of the multiple DRX cycles 902, 904, 906 of the DRX mode previously described with reference to FIG. 9. In the example of FIG. 11, the control information in the control signal 810 may indicate to perform energy harvesting for an energy harvesting duration. In one example, the control information in the control signal 810 may indicate an energy harvesting duration 1106.

In some examples, the energy harvesting duration 1106 may begin upon successful reception of the control signal 810 (e.g., successful decoding of the control signal 810) at the UE 802 or after an offset time. For example, the UE 802 may decode the control signal 810 at time $t_0$ and may perform an energy harvesting operation until the energy harvesting duration 1106 terminates at time $t_1$. In the example of FIG. 11, the energy harvesting duration 1106 may define an energy harvesting time 1104 for the UE 802.

In one example, the energy harvesting duration (e.g., energy harvesting duration 1106) indicated in the control information of the control signal 810 may extend to a subsequent DRX active time, such as the third DRX active time 920 in the third DRX cycle 906. In another example, the energy harvesting duration (e.g., energy harvesting duration 1106) indicated in the control information of the control signal 810 may extend to a time in the DRX cycle before a wake-up signal is expected to be received at the UE 802, such as the time $t_2$ before reception of the wake-up signal 1108.

Figure 12:
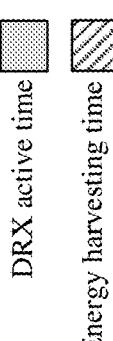
FIG. 12 is a diagram illustrating a scenario where the UE receives the control signal during a DRX active time in one of the multiple DRX cycles of the DRX mode after receiving a preceding control signal in accordance with various aspects of the disclosure.

FIG. 12 is a diagram 1200 illustrating a scenario where the UE 802 receives the control signal 810 during a DRX active time in one of the multiple DRX cycles 902, 904, 906 of the DRX mode (e.g., the DRX mode previously described with reference to FIG. 9), where the control signal 810 contains DCI based on a DCI format type that includes a wake-up signal indication. For example, and as described in detail herein, the DCI format type that includes the wake-up signal indication may be the DCI format 2_6 as defined in the 3GPP standard specification.

The wake-up signal indication (e.g., the wake-up signal indication in DCI format 2_6) may allow the UE 802 to skip a duration of a DRX active time in a DRX cycle and to enter a power saving mode (e.g., a sleep mode). For example, the wake-up signal indication may be a bit (also referred to as a wake-up signal indication bit) that is set to a first value (e.g., '1') or a second value (e.g., '0'). The UE 802 may wake up for an upcoming DRX active time when the wake-up signal indication bit is set to the first value (e.g., '1'), or may not wake up and skip an upcoming DRX active time when the wake-up signal indication bit is set to the second value (e.g., '0').

In some aspects, a preconfigured energy harvesting setting of the UE 802 may indicate that the UE 802 is to perform an energy harvesting operation when a control signal is received during the DRX active time and when that control signal is based on a DCI format type that includes a wake-up signal indication (e.g., DCI format 2_6). In some aspects, the preconfigured energy harvesting setting may include a wake-up signal monitoring bit. The wake-up signal monitoring bit may indicate whether the UE 802 is to perform an energy harvesting operation during a DRX active time if the UE 802 receives a control signal based on the DCI format type that includes a wake-up signal indication (e.g., if the UE 802 receives a control signal including DCI that contains a wake-up signal indication).

In one example, the base station 804 may set the wake-up signal monitoring bit to a first value (e.g., '1') to allow the UE 802 to monitor for the control signal based on the DCI format type that includes the wake-up signal indication during the DRX active time. In another example, the base station 804 may set the wake-up signal monitoring bit to a second value (e.g., '0') to allow the UE 802 to not monitor for the control signal based on the DCI format type that includes a wake-up signal indication during the DRX active time.

In some aspects, if the wake-up signal monitoring bit is set to the first value (e.g., '1') to allow the UE 802 to monitor for the control signal during a DRX active time, and the control signal 810 received during the DRX active time is based on the DCI format type that includes a wake-up signal indication, the UE 802 may perform an energy harvesting operation based on a preconfigured energy harvesting setting. In some examples, the UE 802 may perform the energy harvesting operation in response to the control signal 810 whether the wake-up signal indication in the control signal 810 is set to wake the UE 802 or to not wake the UE 802.

In some aspects, the UE 802 may receive a preceding control signal 810' before the third DRX active time 920 (e.g., at time t₀). The preceding control signal 810' may be based on the DCI format type that includes a wake-up signal indication. The wake-up signal indication in the preceding control signal 810' may be set to wake the UE 802. The UE 802 may wake up in the third DRX active time 920 in response to the preceding control signal 810'.

As shown in FIG. 12, the UE 802 may receive the control signal 810 during the third DRX active time 920 (e.g., at time t₁). The control signal 810 may be based on the DCI format type that includes the wake-up signal indication and the wake-up signal indication may be set to wake the UE 802. In other words, the control signal 810 may include DCI that contains a wake-up signal indication set to wake the UE 802.

In some examples, the UE 802 may consider the control signal 810 received after the preceding control signal 810' as an indication to use a remaining duration of the third DRX active time 920 for an energy harvesting operation. The energy harvesting operation may be based on the preconfigured energy harvesting setting of the UE 802. In this example, the remaining duration 1204 of the third DRX active time 920 may define an energy harvesting time 1202 for the UE 802.

In some examples, the UE 802 may receive the control signal 810 after the preceding control signal 810', and the control signal 810 may indicate a duration for an energy harvesting operation. In one example, the indicated duration may be the remaining duration 1204 of the third DRX active time 920 or a duration that is less than the remaining duration 1204 of the third DRX active time 920. In another example, the indicated duration may extend beyond the end on the third DRX active time 920. This is described with reference to FIG. 13.

Figure 13:
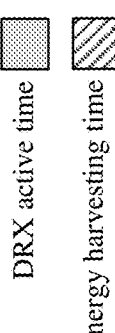
FIG. 13 is a diagram illustrating a scenario where the UE receives the control signal during a DRX active time in one of the multiple DRX cycles of the DRX mode after receiving a preceding control signal in accordance with various aspects of the disclosure.

FIG. 13 is a diagram 1300 illustrating a scenario where the UE 802 receives the control signal 810 during an DRX active time in one of the multiple DRX cycles 902, 904, 906 of the DRX mode (e.g., the DRX mode previously described with reference to FIG. 9), where the control signal 810 is based on the DCI format type that includes a wake-up signal indication. In the example of FIG. 13, the UE 802 may receive the control signal 810 after receiving the preceding control signal 810', and the control signal 810 may indicate a duration for an energy harvesting operation that extends beyond the end of the third DRX active time 920. For example, the duration indicated in the control signal 810 for the energy harvesting operation may be the duration 1304. In this example, the duration 1304 may define an energy harvesting time 1302 for the UE 802.

In some examples, the DCI format type that includes the wake-up signal indication described herein may be the DCI format 2_6 as defined in the 3GPP standard specification. The DCI format 2_6 may be used to convey DCI to a group of UEs. A UE configured with DRX mode operation may be provided certain information to enable detection of a DCI format 2_6 in a PDCCH reception on the PCell or on the SpCell. The certain information to enable detection of a DCI format 2_6 may include a power saving RNTI (PS-RNTI) for DCI format 2_6, a number of search space sets to monitor PDCCH for detection of DCI format 2_6 on the active downlink bandwidth part (BWP) of the PCell or of the SpCell according to a common search space, a payload size for DCI format 2_6, and/or a location in DCI format 2_6 of a wake-up signal indication bit.

In some examples, a value of '0' for the wake-up signal indication bit, when reported to higher layers, may indicate to not start a DRX ON duration timer (also referred to as drxonDurationTimer) for the next long DRX cycle. A value of '1' for the wake-up signal indication bit, when reported to higher layers, may indicate to start the DRX ON duration timer for the next long DRX cycle.

FIG. 14 is a diagram 1400 illustrating a scenario where the UE 802 receives the control signal 810 during a DRX active time in one of the multiple DRX cycles 902, 904, 906 of the DRX mode described with reference to FIG. 9. In the example of FIG. 14, the control information in the control signal 810 may indicate to use a remaining portion of a DRX active time, such as the second DRX active time 914 of the second DRX cycle 904, for energy harvesting based on a power splitting scheme. For example, the base station 804 may be aware that the UE 802 is capable of performing an energy harvesting operation based on the power splitting scheme and may include (e.g., in the control signal 810) energy harvesting configuration parameters and corresponding parameter values associated with the power splitting scheme based on the capability information 805 described with reference to FIG. 8.

With reference to FIG. 14, if the UE 802 receives the control signal 810 during the second DRX active time 914 at time $t_0$, the UE 802 may perform an energy harvesting operation based on a power splitting scheme for the remaining duration 1406 of the second DRX active time 914. Therefore, the remaining duration 1406 of the second DRX active time 914 may define an energy harvesting time 1404 based on a power splitting scheme for the UE 802.

In some aspects, the UE 802 may receive the control signal 810 and may perform an energy harvesting operation based on a power splitting scheme when an SINR value measured at the UE 802 is greater than a threshold. In an example scenario, the UE 802 may be located relatively near the base station 804 and may measure a relatively high SINR value (e.g., an SINR value greater than a threshold). In this scenario, the UE 802 may perform an energy harvesting operation based on a power splitting scheme without a significant reduction in communication quality and/or reliability. In another example scenario, the UE 802 may perform an energy harvesting operation based on a power splitting scheme when the transmissions to the UE 802 can tolerate a high block error rate (BLER).

FIG. 15 is a diagram 1500 illustrating a scenario where the UE 802 receives the control signal 810 during a DRX active time in one of the multiple DRX cycles 902, 904, 906 of the DRX mode previously described with reference to FIG. 9. In the example of FIG. 15, the UE 802 may implement a DRX inactivity timer, which may extend the second DRX active time 914 in response to the control signal 810. In the example of FIG. 15, the control information in the control signal 810 may indicate to use a remaining portion of a DRX active time, such as the second DRX active time 914 of the second DRX cycle 904, for energy harvesting based on a power splitting scheme.

With reference to FIG. 15, if the UE 802 receives the control signal 810 during the second DRX active time 914 at time $t_0$ and the UE 802 implements a DRX inactivity timer, the duration of the second DRX active time 914 may extend beyond the duration 916 to time $t_1$. For example, the UE 802 may perform an energy harvesting operation based on a power splitting scheme for the remaining duration 1506 of the (extended) second DRX active time 914. Therefore, the remaining duration 1506 of the second DRX active time 914 may define an energy harvesting time 1504 based on a power splitting scheme for the UE 802.

FIG. 16 is a diagram 1600 illustrating a scenario where the UE 802 receives the control signal 810 during a DRX active time in one of the multiple DRX cycles 902, 904, 906 of the DRX mode previously described with reference to FIG. 9. In the example of FIG. 16, the control information in the control signal 810 may indicate to perform energy harvesting based on a power splitting scheme for an energy harvesting duration and may indicate a channel monitoring skipping duration. In one example, the control information in the control signal 810 may indicate an energy harvesting duration 1606 and a channel monitoring skipping duration 1610.

In some examples, the energy harvesting duration 1606 may begin upon successful reception of the control signal 810 (e.g., successful decoding of the control signal 810) at the UE 802 or after an offset time. For example, the UE 802 may decode the control signal 810 at time $t_0$ and may perform an energy harvesting operation based on the power splitting scheme until the energy harvesting duration 1606 terminates at time $t_1$. In the example of FIG. 16, the energy harvesting duration 1606 may define an energy harvesting time 1604 based on the power splitting scheme for the UE 802.

The channel monitoring skipping duration 1610 may begin at time $t_1$. The UE 802 may receive the channel monitoring skipping duration 1610 in scenarios where no energy harvesting signals may be available for a portion of a DRX active time (e.g., the portion 1608 of the second DRX active time 914). Therefore, in some examples, the UE 802 may power OFF its information receiver circuit during the channel monitoring skipping duration 1610 (e.g., from time $t_1$ to the end of the duration 916 of the second DRX active time 914) to reduce power consumption.

FIG. 17 is a diagram 1700 illustrating a scenario where the UE 802 receives the control signal 810 during a DRX active time in one of the multiple DRX cycles 902, 904, 906 of the DRX mode previously described with reference to FIG. 9. In the example of FIG. 17, the control information in the control signal 810 may indicate to perform energy harvesting for a first energy harvesting duration 1706 based on a power splitting scheme with a power splitting factor set to a value of less than one and to perform energy harvesting for a second energy harvesting duration 1710 based on the power splitting scheme with the power splitting factor set to one.

In some examples, the power splitting factor indicated in the control information in the control signal 810 may be based on the power splitting factor suggested by the UE 802 in the assistance information 806. In some scenarios, the base station 804 may indicate the power splitting factor suggested by the UE 802 in the control signal 810 if the power splitting factor can support the modulation and coding scheme (MCS) selected for the UE 802. In other scenarios, if the power splitting factor cannot support the MCS selected for the UE 802, the base station 804 may indicate a different power splitting factor that can support the MCS selected for the UE 802.

In some examples, the first energy harvesting duration 1706 may begin upon successful reception of the control signal 810 (e.g., successful decoding of the control signal 810) at the UE 802 or after an offset time. For example, the UE 802 may decode the control signal 810 at time $t_0$ and may perform an energy harvesting operation based on the power splitting scheme with a power splitting factor set to a value of less than one until the first energy harvesting duration 1706 terminates at time $t_1$. In the example of FIG. 17, the first energy harvesting duration 1706 may define a first energy harvesting time 1704 based on the power splitting scheme for the UE 802.

The second energy harvesting duration 1710 may begin at time $t_1$. The UE 802 may perform an energy harvesting operation based on the power splitting scheme with a power splitting factor set to one until termination of the second energy harvesting duration 1710. In the example of FIG. 17, the second energy harvesting duration 1710 may define a second energy harvesting time 1708 based on the power splitting scheme for the UE 802.

It should be noted that when the power splitting factor is set to one, the UE 802 may not transfer any part of a wireless signal received at an antenna of the UE 802 (e.g., the antenna 608) to an input of an information receiver circuit of the UE 802 (e.g., the input 616 of the information receiver circuit 604). Therefore, in some examples, the UE 802 may only perform energy harvesting when the power splitting factor is set to one.

Figure 18:
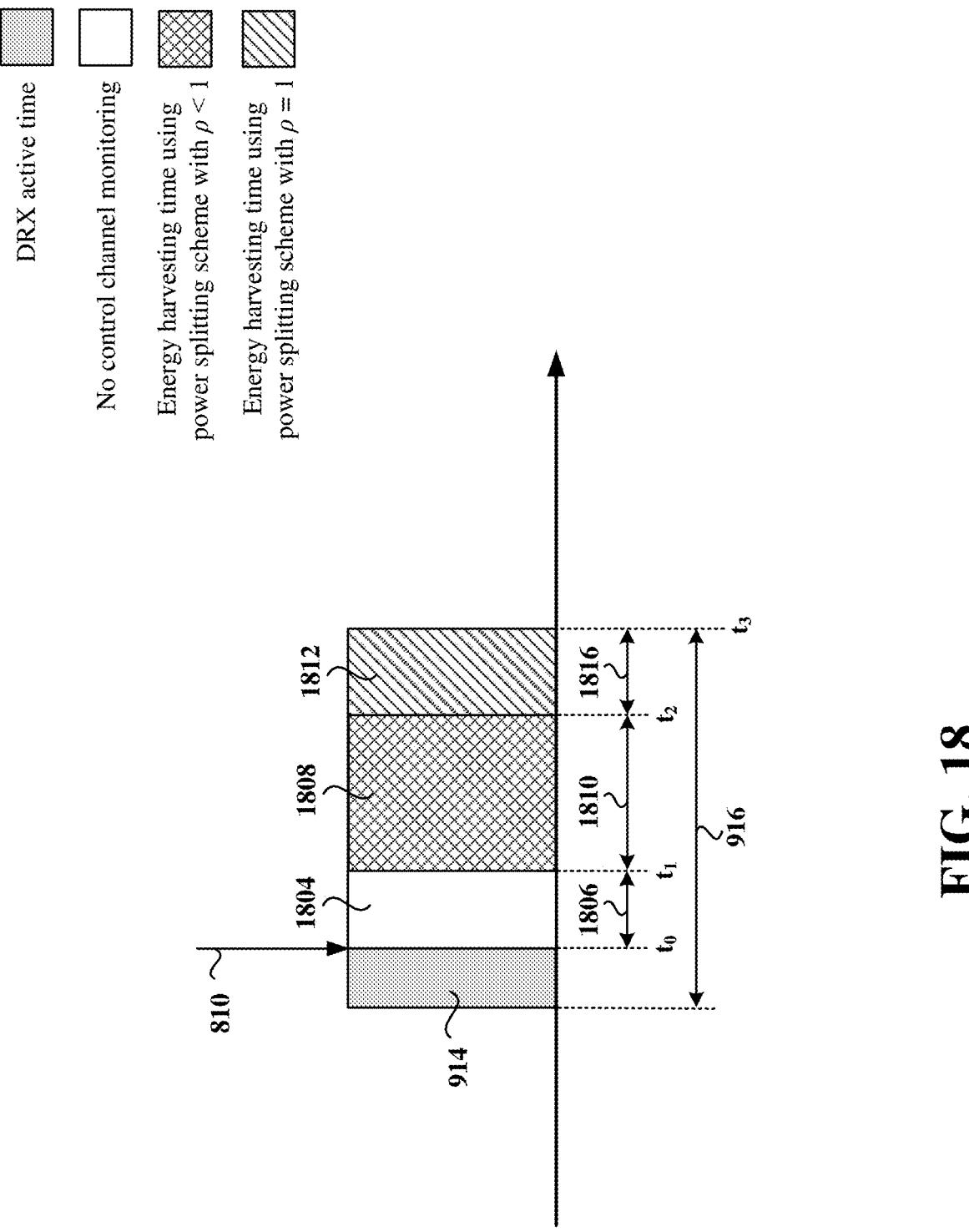
FIG. 18 is a diagram illustrating a scenario where the UE receives the control signal during the DRX active time in the second DRX cycle of the DRX mode in accordance with various aspects of the disclosure.

FIG. 18 is a diagram illustrating a scenario where the UE 802 receives the control signal 810 during the second DRX active time 914 in the second DRX cycle 904 of the DRX mode previously described with reference to FIG. 9. In the example of FIG. 18, the control information in the control signal 810 may include an indication to skip monitoring of a control channel for a duration 1806, an indication to perform energy harvesting for a first energy harvesting duration 1810 based on the power splitting scheme with the power splitting factor set to a value of less than one, and an indication to perform energy harvesting for a second energy harvesting duration 1816 based on the power splitting scheme with the power splitting factor set to one.

In some examples, the duration 1806 for skipping monitoring of the control channel may begin upon successful reception of the control signal 810 (e.g., successful decoding of the control signal 810) at the UE 802 or after an offset time. In the examples described herein, an offset time may be indicated in the control information in the control signal 810 or may be preconfigured at the UE 802 as a preconfigured energy harvesting setting. In some examples, the offset time may be preconfigured by specification or preconfigured via an RRC message prior to reception of the control signal 810. In some examples, the offset time may be selected based on a UE condition, an RRC pre-configuration, a pre-configuration based on a specification, or combinations thereof. For example, the UE 802 may decode the control signal 810 at time $t_0$ and may skip monitoring of a control channel until the duration 1806 terminates at time $t_1$.

The UE 802 may receive the channel monitoring skipping duration 1806 in scenarios where no energy harvesting signals may be available for a portion of a DRX active time (e.g., the portion 1804 of the second DRX active time 914). Therefore, in some examples, the UE 802 may power OFF its information receiver circuit during the channel monitoring skipping duration 1806 (e.g., from time $t_0$ to time $t_1$) to reduce power consumption.

The first energy harvesting duration 1810 may begin at time $t_1$. The UE 802 may perform an energy harvesting operation based on the power splitting scheme with a power splitting factor set to a value of less than one until the first energy harvesting duration 1810 terminates at time $t_2$. In the example of FIG. 18, the first energy harvesting duration 1810 (e.g., from time $t_1$ to time $t_2$) may define a first energy harvesting time 1808 based on the power splitting scheme for the UE 802.

The second energy harvesting duration 1816 may begin at time $t_2$. The UE 802 may perform an energy harvesting operation based on the power splitting scheme with a power splitting factor set to one until termination of the second energy harvesting duration 1816 at time $t_3$. In the example of FIG. 18, the second energy harvesting duration 1816 (e.g., from time $t_2$ to time $t_3$) may define a second energy harvesting time 1812 based on the power splitting scheme for the UE 802.

In the examples described herein, a duration indicated in the control signal 810, such as the energy harvesting durations 1606, 1706, 1710, 1810, 1816 and/or the durations 1610, 1806 for skipping monitoring of the control channel, may be indicated in terms of an amount of time (e.g., milliseconds), a number of symbols, or other suitable indication.

Referring back to FIG. 8, in some aspects, the UE 802 may use a first signal 816 (also referred to as an energy harvesting signal) received from the base station 804 for the energy harvesting operation at 814. For example, the first signal 816 may be a signal transmitted on a data channel (e.g., the PDSCH), a control channel (e.g., the PDCCH), or other type of channel. In some examples, the first signal 816 may be a signal dedicated for energy harvesting purposes. In other examples, the first signal 816 may include a data transmission or a control transmission for the UE 802 and/or a different UE.

In other aspects, the UE 802 may use a second signal 818 (also referred to as an energy harvesting signal) for the energy harvesting operation at 814. The second signal 818 may be any type of energy signal (e.g., an RF signal) that the UE 802 may use for energy harvesting. In some examples, the second signal 818 may be transmitted from a source not associated with the wireless communication network (e.g., a 5G NR network) of the UE 802 and the base station 804.

As described herein, the control signal 810 may enable an energy harvesting operation in the DRX mode. In some examples, the control signal 810 may be based on a DCI format type (e.g., the control signal 810 may carry DCI according to a DCI format type), such as a DCI format type that includes an indication to skip monitoring of a control channel, a new DCI format type different from the DCI format type that includes an indication to skip monitoring of a control channel, or a DCI format type that includes a wake-up signal (WUS) indication (e.g., DCI format 2_6). In other examples, the control signal 810 may include a MAC-CE message, an RRC message, a paging early indication (PEI), and/or other suitable signal or message.

In some aspects of the disclosure, the control signal 810 may be configured to indicate any one of different energy harvesting schemes to a UE using a same DCI format type. In some examples, the control signal 810 may indicate first configuration information associated with a first energy harvesting scheme or second configuration information associated with a second energy harvesting scheme. For example, the control signal 810 may use a DCI format type to carry configuration information associated with a first energy harvesting scheme (e.g., energy harvesting configuration parameter values for the time-switching scheme) and may be associated with a first radio network temporary identifier (RNTI). The control signal 810 may also use that DCI format type to carry configuration information associated with a second energy harvesting scheme (e.g., energy harvesting configuration parameter values for the power splitting scheme) and may be associated with a second RNTI.

Since different energy harvesting schemes may involve different energy harvesting configuration parameters and/or different parameter value sizes, a DCI payload (e.g., in the control signal 810) associated with one energy harvesting scheme may be different from a DCI payload associated with a different energy harvesting scheme. Therefore, in some examples, a UE 802 may interpret a DC payload in the control signal 810 differently based on the identifier (e.g., an RNTI) associated with the control signal 810.

In some aspects of the disclosure, the control signal 810 may be configured to indicate any one of different energy harvesting schemes to the UE 802 using a DCI format type, where the DCI payload size is aligned with an existing DCI format type. In some aspects of the disclosure, an aggregation level and a number of control channel candidates (e.g., PDCCH candidates) may be reused from an existing search space (SS) set to reduce collisions.

In some examples, the control signal 810 may be based on an existing DCI format type (e.g., the control signal 810 may carry DCI according to an existing DCI format type). The existing DCI format type may include multiple control information fields. In one example, the existing DCI format type may include control information fields configured to carry data scheduling information and an indication to skip monitoring of a control channel (e.g., the PDCCH). In this example, one or more control information fields may be added to the existing DCI format type to carry information associated with an energy harvesting operation.

In another example, the existing DCI format type including control information fields configured to carry the data scheduling information and the indication to skip monitoring of a control channel (e.g., the PDCCH) may be used for non-data scheduling DCI. In this example, one or more of the control information fields configured to carry the data scheduling information may be repurposed to carry information associated with an energy harvesting operation.

In some examples, an energy harvesting control field configured to enable or disable an energy harvesting operation may be added to the previously described existing DCI format type. For example, the energy harvesting control field may be a one bit field. In this example, the energy harvesting control field may be set to '1' to enable an energy harvesting operation at the UE 802 in the DRX mode or may be set to '0' to disable the energy harvesting operation at the UE 802 in the DRX mode.

For example, one or more of the control information fields of the previously described existing DCI format type may be used to carry different energy harvesting configuration parameter values, such as an identifier of a component carrier for the energy harvesting operation, a bandwidth associated with the component carrier, quasi-colocation information (e.g., at least one TCI state) associated with an energy harvesting signal for the energy harvesting operation, a first time-frequency resource to be used for the energy harvesting operation during a DRX active time of the DRX mode, a second time-frequency resource to be used for the energy harvesting operation during an OFF cycle of the DRX mode, and/or a duration of an energy harvesting time for the energy harvesting operation. In some examples, one or more control information fields may be added to the existing DCI format type to carry any of the previously described energy harvesting configuration parameter values associated with the energy harvesting operation.

As another example, one or more of the control information fields of the previously described existing DCI format type may be used to carry at least one of an indication of a power splitting scheme for the energy harvesting operation, a power splitting factor for the power splitting scheme, a first duration for application of the power splitting scheme during a DRX active time of the DRX mode when the power splitting factor is set to a value of less than one, a second duration for application of the power splitting scheme during the DRX active time when the power splitting factor is set to one, a third duration over which the UE 802 is to skip monitoring of a control channel during the DRX active time, or a time-frequency resource to be used for the energy harvesting operation during an OFF cycle of the DRX mode. In some examples, one or more control information fields may be added to the existing DCI format type to carry any of the previously described energy harvesting configuration parameter values associated with the energy harvesting operation based on the power splitting scheme.

In some examples, the control signal 810 may be based on a DCI format type that includes a wake-up signal indication, such as the DCI format 2_6 as defined in the 3GPP standard specification. A base station (e.g., the base station 804) may use an existing RNTI or may assign a different RNTI to transmit the control signal 810 including DCI based on the DCI format 2_6 during the DRX active time of a UE (e.g., the UE 802) to enable an energy harvesting operation at the UE in the DRX mode.

The UE 802 may perform the energy harvesting operation in response to the control signal 810 (e.g., the control signal 810 based on the DCI format 2_6). For example, the existing RNTI or the different RNTI may serve as an indication to the UE to use preconfigured energy harvesting configuration parameters for the energy harvesting operation. In some examples, the preconfigured energy harvesting configuration parameters may include a value of a representing a portion of a time period T allocated for energy harvesting, the value of ρ representing the power splitting factor, or other appropriate energy harvesting configuration parameters.

For example, the preconfigured energy harvesting configuration parameters may be provided to the UE via a configuration message (e.g., the configuration message 807) using layer 2 and/or layer 3 signaling. For example, the preconfigured energy harvesting configuration parameters may be provided to the UE in an RRC message, a MAC-CE message, and/or other suitable message.

In some examples, the base station (e.g., the base station 804) may modify the DCI format 2_6 to include one or more additional fields associated with an energy harvesting operation and may use the modified DCI format 2_6 to transmit (unicast) DCI to a certain UE (e.g., the UE 802). In these examples, a size of the DCI format 2_6 may be modified (e.g., increased) to include the one or more additional fields associated with an energy harvesting operation. For example, an energy harvesting indication field may be added to the DCI format 2_6. In an example implementation, the energy harvesting indication field may be a one bit field for carrying an energy harvesting indication. The energy harvesting indication may be a first value (e.g., '1') to enable an energy harvesting operation at the UE 802 in the DRX mode or may be a second value (e.g., '0') to disable the energy harvesting operation at the UE 802 in the DRX mode.

The base station may assign a RNTI to the certain UE (e.g., the UE 802) and may indicate a payload size of the modified DCI format 2_6 and/or a location of the additional fields associated with an energy harvesting operation (e.g., an energy harvesting indication field) in the modified DCI format 2_6. The base station may transmit DCI based on the modified DCI format 2_6 using the RNTI assigned to the certain UE.

In some examples, the DCI format type that includes the WUS indication and the energy harvesting indication may be used to transmit DCI to a group of UEs. In this example, one or more of the energy harvesting configuration parameters may be included in DCI and conveyed to the group of UEs, or may be indicated to each of the group of UEs via an RRC message. For example, one or more of the energy harvesting configuration parameters may be indicated to each of the group of UEs via an RRC message if the DCI size shared by the group of UEs is limited. A UE in the group of UEs (e.g., the UE 802) may determine a QCL source based on the best DL beam used for transmissions (e.g., data transmissions) to that UE or based on a best receive beam autonomously determined by that UE.

Figure 19:
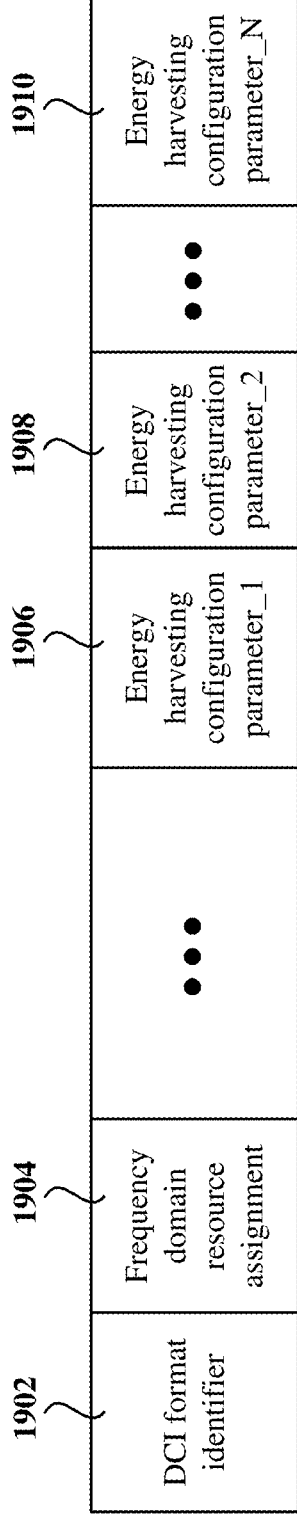
FIG. 19 illustrates an example downlink control information (DCI) format associated with an energy harvesting operation in accordance with various aspects of the disclosure.

FIG. 19 illustrates an example downlink control information (DCI) format 1900 associated with an energy harvesting operation in accordance with various aspects of the disclosure. In some implementations, the UE 802 may receive DCI in the control signal 810 via a control channel (e.g., the PDCCH) based on the DCI format 1900.

The DCI format 1900 may include multiple control information fields, such as a control information field 1902 for a DCI format identifier, a control information field 1904 for a frequency domain resource assignment, and/or other control information fields for carrying control information the UE 802 may need for proper reception and decoding of downlink transmissions.

The DCI format 1900 may further include control information fields for carrying control information associated with an energy harvesting operation at the UE 802. In some examples, each of these control information fields may be configured to carry an energy harvesting configuration parameter value as described herein. In some aspects, the energy harvesting configuration parameters for which values are provided in the DCI format 1900 may be based on the energy harvesting class indicated in the capability information 805.

For example, a control information field 1906 may carry a first energy harvesting configuration parameter value, such as an energy harvesting control parameter value. In one example, the control information field 1906 may be a one bit field which may be set to '1' to enable an energy harvesting operation at the UE 802 in the DRX mode or set to '0' to disable the energy harvesting operation at the UE 802 in the DRX mode.

A control information field 1908 may carry a second energy harvesting configuration parameter value, such as the value of a representing a portion of a time period T allocated for energy harvesting or the value of ρ representing the power splitting factor. In one example, the control information field 1908 may be a two-bit field where different bit values are mapped to different second energy harvesting configuration parameter values. For example, the bit values '00', '01', '10' and 11' in the control information field 1908 may be respectively mapped to the values 0, 0.25, 0.5, and 1.

The DCI format 1900 may include up to N control information fields, where the control information field 1910 may carry an Nth energy harvesting configuration parameter value. It can be appreciated that the DCI format 1900 may be modified in terms of the number of control information fields associated with an energy harvesting operation and/or the energy harvesting configuration parameters indicated in the DCI. Such modifications may provide different DCI format types to support various energy harvesting schemes and capabilities of different UEs.

FIG. 20 is a flowchart 2000 of a method of wireless communication. The method may be performed by a UE (e.g., the UE 104, 802; the apparatus 2202/2202': the processing system 2314, which may include the memory 360 and which may be the entire UE 104, 802 or a component of the UE 104, 802, such as the TX processor 368, the RX processor 356, and/or the controller/processor 359).

At 2002, the UE enters a DRX mode. For example, at 808 in FIG. 8, the UE 802 may enter a DRX mode to reduce power consumption. The DRX mode may include one or more DRX cycles, where each DRX cycle includes a DRX active time. For example, with reference to FIG. 9, the UE may be configured with a first DRX active time 908 in the first DRX cycle duration 902, a second DRX active time 914 in the second DRX cycle duration 904, and a third DRX active time 920 in the third DRX cycle duration 906. The UE is expected to monitor a control channel (e.g., the PDCCH) during a DRX active time in a DRX cycle. In a remaining duration of each DRX cycle (e.g., a duration outside of the DRX active time), the UE 802 may not be expected to monitor the control channel.

At 2004, the UE receives a control signal during an active time of the DRX mode, the control signal enabling an energy harvesting operation in the DRX mode. In some aspects, the control signal may be the control signal 810 described herein. For example, with reference to FIG. 8, the UE 802 may receive the control signal 810 during a DRX active time, such as the second DRX active time 914.

In some aspects, the control signal may include control information. In some examples, the control information includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the DRX mode, a second time-frequency resource to be used for the energy harvesting operation during a period in an OFF cycle of the DRX mode extended from the active time or during a period between the active time and a next active time, or a duration of an energy harvesting time for the energy harvesting operation.

In some examples, the control information is based on the reported capability (e.g., in the capability information 805) from the UE. For example, a network entity (e.g., the base station 804) providing the control information may be aware of the energy harvesting class of the UE from the reported capability information and may include (e.g., in the control signal 810) energy harvesting configuration parameters and corresponding parameter values associated with that energy harvesting class.

In some examples, the control information includes a bit value in an energy harvesting control field, wherein the bit value enables the energy harvesting operation. For example, the energy harvesting control field may be a one bit field. In this example, the energy harvesting control field may be set to '1' to enable an energy harvesting operation at the UE 802 in the DRX mode or may be set to '0' to disable the energy harvesting operation at the UE 802 in the DRX mode.

In some examples, the control signal includes an indication to skip monitoring of a control channel for at least a portion of the active time of the DRX mode. In one example, with reference to FIGS. 8 and 16, the control information in the control signal 810 may indicate a channel monitoring skipping duration 1610. In some examples, the control signal is based on a downlink control information format type that includes an indication to skip monitoring of a control channel.

In some examples, the control signal is associated with a first identifier when the control signal indicates first configuration information associated with a first energy harvesting scheme or second configuration information associated with a second energy harvesting scheme.

In some examples, the control signal indicates a power splitting scheme for the energy harvesting operation. The control information may include at least one of a power splitting factor (e.g., the power splitting factor ρ described with reference to FIG. 7) for the power splitting scheme, a first duration for application of the power splitting scheme (e.g., the first energy harvesting duration 1706) during the active time of the DRX mode when the power splitting factor is set to a value of less than one, a second duration for application of the power splitting scheme (e.g., the second energy harvesting duration 1708) during the active time when the power splitting factor is set to one, a third duration over which the apparatus is to skip monitoring of a control channel during the active time (e.g., the duration 1806 for skipping monitoring of the control channel), or a time-frequency resource to be used for the energy harvesting operation during an OFF cycle of the DRX mode.

In some implementations, with reference to FIGS. 8 and 19, the UE 802 may receive DCI in the control signal 810 via a control channel (e.g., the PDCCH) based on the DCI format 1900. The DCI format 1900 may include multiple control information fields, such as a control information field 1902 for a DCI format identifier, a control information field 1904 for a frequency domain resource assignment, and/or other control information fields for carrying control information the UE 802 may need for proper reception and decoding of downlink transmissions.

The DCI format 1900 may include control information fields for carrying control information associated with an energy harvesting operation at the UE 802. In some examples, each of these control information fields may be configured to carry an energy harvesting configuration parameter value as described herein. In one example, the control information field 1906 may be a one bit field which may be set to '1' to enable an energy harvesting operation at the UE 802 in the DRX mode or set to '0' to disable the energy harvesting operation at the UE 802 in the DRX mode.

At 2006, the UE performs the energy harvesting operation in response to the control signal, where the energy harvesting operation is performed based on at least one of a reported capability, a preconfigured energy harvesting setting, control information in the control signal, or a combination thereof. In some examples, the UE may perform the energy harvesting operation in response to the control signal as described with reference to 814 in FIG. 8 or as described in any one of FIGS. 10-18.

In some examples, the energy harvesting operation may be based on the time-switching scheme described with reference to FIG. 6, the power splitting scheme described with reference to FIG. 7, or other suitable energy harvesting scheme supported at the UE. In some aspects, the UE may remain in the DRX mode while performing the energy harvesting operation. For example, with reference to FIG. 8, the UE 802 may use the first signal 816 and/or the second signal 818 for the energy harvesting operation.

In some examples, with reference to FIG. 8, the UE 802 may receive the preconfigured energy harvesting setting via the configuration message 807. In some examples, the preconfigured energy harvesting setting indicates that the energy harvesting operation is to be performed when the control signal is received during the active time (e.g., a DRX active time of the UE in the DRX mode) and when the control signal is based on a downlink control information format type that includes a wake-up signal indication. For example, with reference to FIG. 8, the control signal 810 may be based on a DCI format type that includes a wake-up signal indication, such as the DCI format 2_6 as defined in the 3GPP standard specification. In some examples, the wake-up signal indication is set to wake the apparatus or to not wake the apparatus.

FIG. 21 is a flowchart 2100 of a method of wireless communication. The method may be performed by a UE (e.g., the UE 104, 802; the apparatus 2202/2202': the processing system 2314, which may include the memory 360 and which may be the entire UE 104, 802 or a component of the UE 104, 802, such as the TX processor 368, the RX processor 356, and/or the controller/processor 359). It should be understood that blocks indicated with dashed lines in FIG. 21 represent optional blocks.

At 2102, the UE transmits assistance information associated with an energy harvesting operation. For example, with reference to FIG. 8, the assistance information 806 may include a value suggested by the UE 802 for at least one operating parameter of the UE 802. For example, the assistance information 806 may include a suggested value for a power splitting factor for an energy harvesting operation based on a power splitting scheme. In some aspects, the UE 802 may suggest higher values for the power splitting factor (e.g., a value greater than 0.5) if a battery level of the UE 802 is below a threshold and may suggest lower values for the power splitting factor (e.g., a value less than or equal to 0.5) if a battery level of the UE 802 is above the threshold.

At 2104, the UE enters a DRX mode. For example, at 808 in FIG. 8, the UE 802 may enter a DRX mode to reduce power consumption. The DRX mode may include one or more DRX cycles, where each DRX cycle includes a DRX active time. For example, with reference to FIG. 9, the UE may be configured with a first DRX active time 908 in the first DRX cycle duration 902, a second DRX active time 914 in the second DRX cycle duration 904, and a third DRX active time 920 in the third DRX cycle duration 906. The UE is expected to monitor a control channel (e.g., the PDCCH) during a DRX active time in a DRX cycle. In a remaining duration of each DRX cycle (e.g., a duration outside of the DRX active time), the UE 802 may not be expected to monitor the control channel.

At 2106, the UE receives a control signal during an active time of the DRX mode, the control signal enabling an energy harvesting operation in the DRX mode. In some aspects, the control signal may be the control signal 810 described herein. For example, with reference to FIG. 8, the UE 802 may receive the control signal 810 during a DRX active time, such as the second DRX active time 914.

In some aspects, the control signal may include control information. In some examples, the control information includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the DRX mode, a second time-frequency resource to be used for the energy harvesting operation during a period in an OFF cycle of the DRX mode extended from the active time or during a period between the active time and a next active time, or a duration of an energy harvesting time for the energy harvesting operation.

In some examples, the control information in the control signal (e.g., the control signal 810) is based on the reported capability (e.g., in the capability information 805) from the UE. For example, a network entity (e.g., the base station 804) providing the control information may be aware of the energy harvesting class of the UE from the reported capability information and may include (e.g., in the control signal 810) energy harvesting configuration parameters and corresponding parameter values associated with that energy harvesting class.

In some examples, the control information includes a bit value in an energy harvesting control field, wherein the bit value enables the energy harvesting operation. For example, the energy harvesting control field may be a one bit field. In this example, the energy harvesting control field may be set to '1' to enable an energy harvesting operation at the UE 802 in the DRX mode or may be set to '0' to disable the energy harvesting operation at the UE 802 in the DRX mode.

In some examples, the control signal includes an indication to skip monitoring of a control channel for at least a portion of the active time of the DRX mode. In one example, with reference to FIGS. 8 and 16, the control information in the control signal 810 may indicate a channel monitoring skipping duration 1610. In some examples, the control signal is based on a downlink control information format type that includes an indication to skip monitoring of a control channel.

In some examples, the control signal is associated with a first identifier when the control signal indicates first configuration information associated with a first energy harvesting scheme or second configuration information associated with a second energy harvesting scheme.

In some examples, the control signal indicates a power splitting scheme for the energy harvesting operation. The control information may include at least one of a power splitting factor (e.g., the power splitting factor ρ described with reference to FIG. 7) for the power splitting scheme, a first duration for application of the power splitting scheme (e.g., the first energy harvesting duration 1706) during the active time of the DRX mode when the power splitting factor is set to a value of less than one, a second duration for application of the power splitting scheme (e.g., the second energy harvesting duration 1708) during the active time when the power splitting factor is set to one, a third duration over which the apparatus is to skip monitoring of a control channel during the active time (e.g., the duration 1806 for skipping monitoring of the control channel), or a time-frequency resource to be used for the energy harvesting operation during an OFF cycle of the DRX mode.

In some implementations, with reference to FIGS. 8 and 19, the UE 802 may receive DCI in the control signal 810 via a control channel (e.g., the PDCCH) based on the DCI format 1900. The DCI format 1900 may include multiple control information fields, such as a control information field 1902 for a DCI format identifier, a control information field 1904 for a frequency domain resource assignment, and/or other control information fields for carrying control information the UE 802 may need for proper reception and decoding of downlink transmissions.

The DCI format 1900 may include control information fields for carrying control information associated with an energy harvesting operation at the UE 802. In some examples, each of these control information fields may be configured to carry an energy harvesting configuration parameter value as described herein. In one example, the control information field 1906 may be a one bit field which may be set to '1' to enable an energy harvesting operation at the UE 802 in the DRX mode or set to '0' to disable the energy harvesting operation at the UE 802 in the DRX mode.

At 2108, the UE powers OFF an information receiver circuit of the apparatus during the active time of the DRX mode in response to the control signal. For example, at 812 in FIG. 8, the UE 802 optionally powers OFF at least one portion of an information receiver circuit of the UE 802 during a DRX active time of the DRX mode in response to the control signal 810.

At 2110, the UE performs the energy harvesting operation in response to the control signal, where the energy harvesting operation is performed based on at least one of a reported capability, a preconfigured energy harvesting setting, control information in the control signal, or a combination thereof. In some examples, the UE may perform the energy harvesting operation in response to the control signal as described with reference to 814 in FIG. 8 or as described in any one of FIGS. 10-18.

In some examples, the energy harvesting operation may be based on the time-switching scheme described with reference to FIG. 6, the power splitting scheme described with reference to FIG. 7, or other suitable energy harvesting scheme supported at the UE. In some aspects, the UE may remain in the DRX mode while performing the energy harvesting operation. For example, with reference to FIG. 8, the UE 802 may use the first signal 816 and/or the second signal 818 for the energy harvesting operation.

In some examples, with reference to FIG. 8, the UE 802 may receive the preconfigured energy harvesting setting via the configuration message 807. In some examples, the preconfigured energy harvesting setting indicates that the energy harvesting operation is to be performed when the control signal is received during the active time (e.g., a DRX active time of the UE in the DRX mode) and when the control signal is based on a downlink control information format type that includes a wake-up signal indication. For example, with reference to FIG. 8, the control signal 810 may be based on a DCI format type that includes a wake-up signal indication, such as the DCI format 2_6 as defined in the 3GPP standard specification. In some examples, the wake-up signal indication is set to wake the apparatus or to not wake the apparatus.

Figure 22:
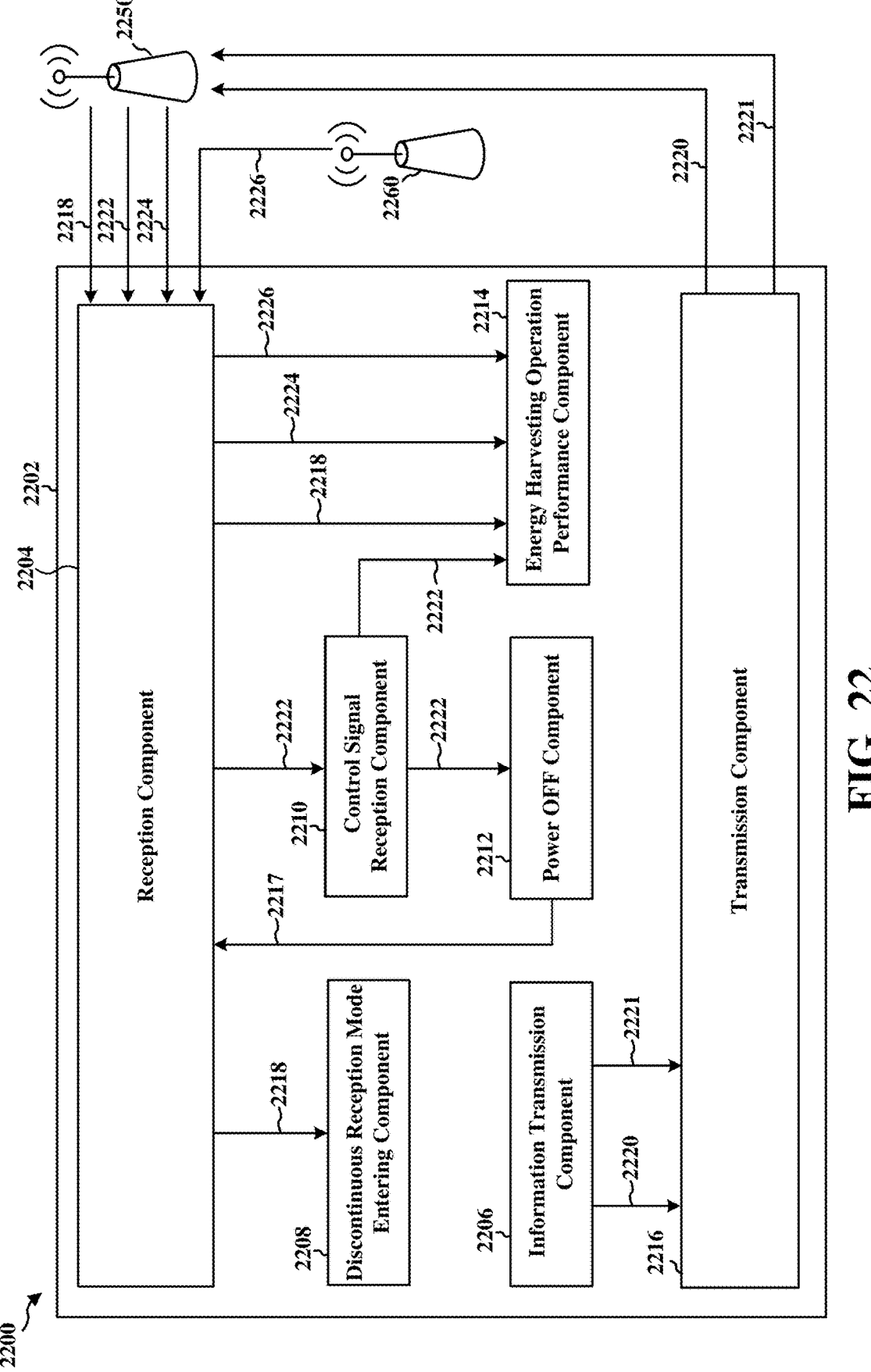
FIG. 22 is a conceptual data flow diagram illustrating the data flow between different means/components in an example apparatus.

FIG. 22 is a conceptual data flow diagram 2200 illustrating the data flow between different means/components in an example apparatus 2202. The apparatus may be a UE.

The apparatus includes a reception component 2204 that receives downlink signals (e.g., a configuration message 2218, a control signal 2222) and an energy signal 2224 from a base station 2250 and an energy signal 2226 from a transmitter 2260 (e.g., a base station, a network node, a non-network RF source, or other suitable device capable of transmitting an energy signal).

The apparatus includes an information transmission component 2206 that transmits (e.g., via the transmission component 2216) assistance information 2220 and capability information 2221 associated with the energy harvesting operation.

The apparatus includes a DRX mode entering component 2208 that enters a DRX mode. The DRX mode entering component 2208 receives a configuration message 2218, which may indicate at least one duration for a DRX cycle, at least one duration for a DRX active time of the DRX cycle, a duration for an inactivity timer, and/or other suitable information for configuring a DRX mode of the apparatus.

The apparatus includes a control signal reception component 2210 that receive a control signal 2222 during an active time of the DRX mode, the control signal 2222 enabling an energy harvesting operation in the DRX mode.

The apparatus includes a power OFF component 2212 that powers OFF an information receiver circuit of the apparatus during the active time of the DRX mode in response to the control signal 2222. The power OFF component 2212 may power OFF an information receiver circuit of the apparatus (e.g., an information receiver circuit of the reception component 2204) via a power OFF indication signal 2217.

The apparatus includes an energy harvesting operation performance component 2214 that performs the energy harvesting operation in response to the control signal 2222 based on at least one of a preconfigured energy harvesting setting, control information in the control signal 2222, or a combination thereof. The energy harvesting operation performance component 2214 may use a signal 2224 (e.g., an energy signal or a downlink signal) from the base station 2250 for an energy harvesting operation (e.g., the energy harvesting operation performance component 2214 may harvest energy using the signal 2224). The energy harvesting operation performance component 2214 may use a signal 2226 (e.g., an energy signal or a downlink signal) from the transmitter 2260 for an energy harvesting operation (e.g., the energy harvesting operation performance component 2214 may harvest energy using the signal 2226).

The apparatus includes a transmission component 2216 that transmits uplink signals, such as the assistance information 2220 and the capability information 2221.

The apparatus may include additional components that perform each of the blocks of the algorithm in the aforementioned flowcharts of FIGS. 20 and 21. As such, each block in the aforementioned flowcharts of FIGS. 20 and 21 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 23:
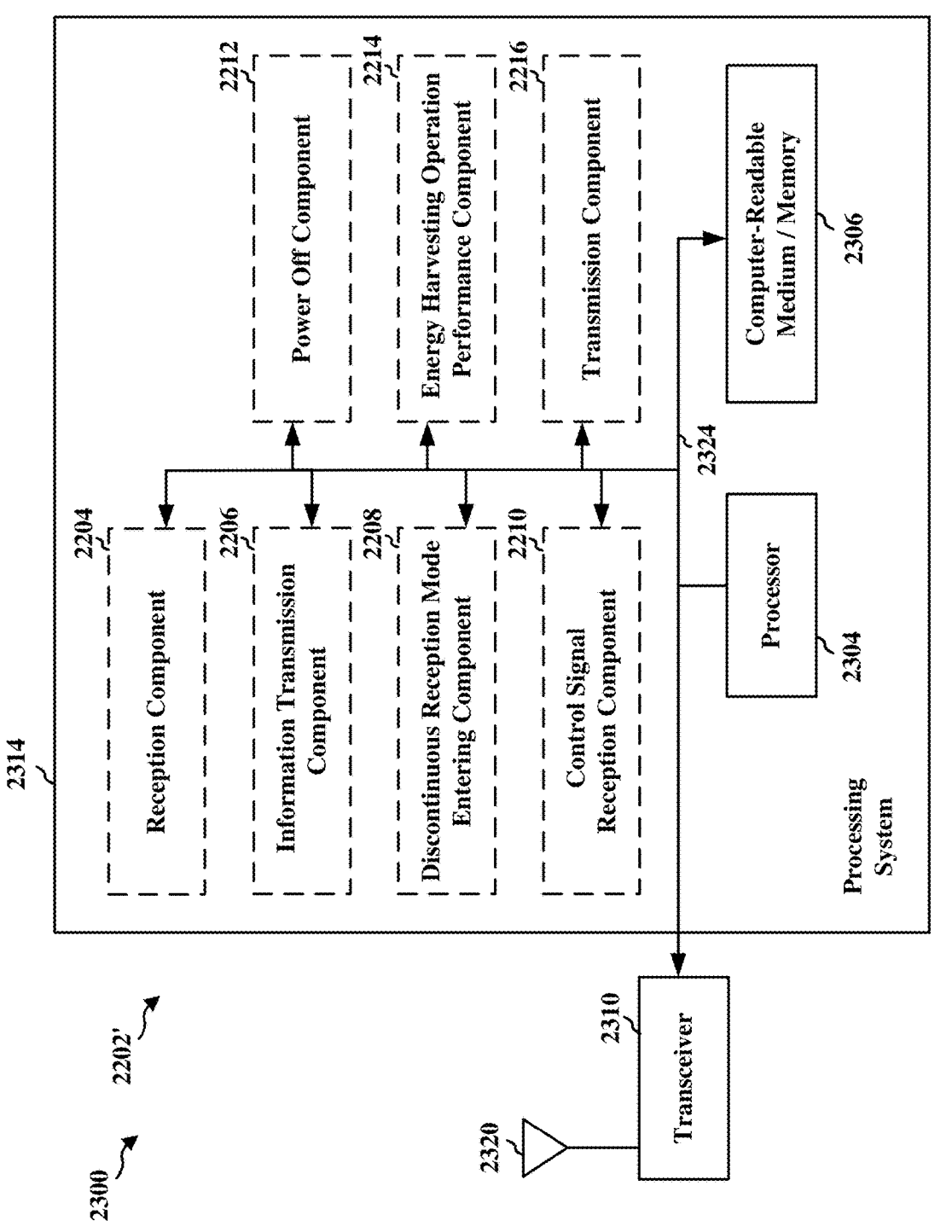
FIG. 23 is a diagram illustrating an example of a hardware implementation for an apparatus employing a processing system.

FIG. 23 is a diagram 2300 illustrating an example of a hardware implementation for an apparatus 2202' employing a processing system 2314. The processing system 2314 may be implemented with a bus architecture, represented generally by the bus 2324. The bus 2324 may include any number of interconnecting buses and bridges depending on the specific application of the processing system 2314 and the overall design constraints. The bus 2324 links together various circuits including one or more processors and/or hardware components, represented by the processor 2304, the components 2204, 2206, 2208, 2210, 2212, 2214, 2216, and the computer-readable medium/memory 2306. The bus 2324 may also link various other circuits such as timing sources, peripherals, voltage regulators, and power management circuits, which are well known in the art, and therefore, will not be described any further.

The processing system 2314 may be coupled to a transceiver 2310. The transceiver 2310 is coupled to one or more antennas 2320. The transceiver 2310 provides a means for communicating with various other apparatus over a transmission medium. The transceiver 2310 receives a signal from the one or more antennas 2320, extracts information from the received signal, and provides the extracted information to the processing system 2314, specifically the reception component 2204. In addition, the transceiver 2310 receives information from the processing system 2314, specifically the transmission component 2216, and based on the received information, generates a signal to be applied to the one or more antennas 2320. The processing system 2314 includes a processor 2304 coupled to a computer-readable medium/memory 2306. The processor 2304 is responsible for general processing, including the execution of software stored on the computer-readable medium/memory 2306. The software, when executed by the processor 2304, causes the processing system 2314 to perform the various functions described supra for any particular apparatus. The computer-readable medium/memory 2306 may also be used for storing data that is manipulated by the processor 2304 when executing software. The processing system 2314 further includes at least one of the components 2204, 2206, 2208, 2210, 2212, 2214, 2216. The components may be software components running in the processor 2304, resident/stored in the computer readable medium/memory 2306, one or more hardware components coupled to the processor 2304, or some combination thereof. The processing system 2314 may be a component of the UE 350 and may include the memory 360 and/or at least one of the TX processor 368, the RX processor 356, and the controller/processor 359. Alternatively, the processing system 2314 may be the entire UE (e.g., see 350 of FIG. 3).

In one configuration, the apparatus 2202/2202' for wireless communication includes means for entering a DRX mode, means for receiving a control signal during an active time of the DRX mode, the control signal enabling an energy harvesting operation in the DRX mode, means for performing the energy harvesting operation in response to the control signal, wherein the energy harvesting operation is performed based on at least one of a reported capability, a preconfigured energy harvesting setting, control information in the control signal, or a combination thereof, means for powering OFF an information receiver circuit of the apparatus during the active time of the DRX mode in response to the control signal, means for transmitting assistance information associated with the energy harvesting operation, wherein at least a portion of the control information in the control signal is based on the assistance information.

The aforementioned means may be one or more of the aforementioned components of the apparatus 2202 and/or the processing system 2314 of the apparatus 2202' configured to perform the functions recited by the aforementioned means. As described supra, the processing system 2314 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

Figure 24:
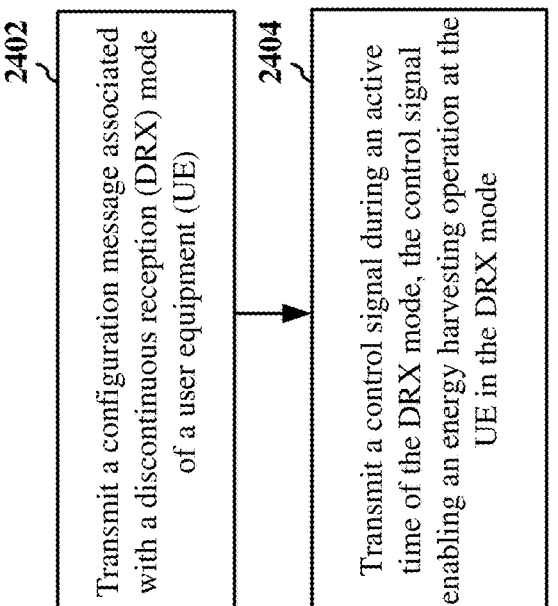
FIG. 24 is a flowchart of a method of wireless communication.

FIG. 24 is a flowchart 2400 of a method of wireless communication. The method may be performed by a base station 102, 804 (e.g., the base station 102, 804; the apparatus 2602/2602'; the processing system 2714, which may include the memory 376 and which may be the entire base station 102, 804 or a component of the base station 102, 804, such as the TX processor 316, the RX processor 370, and/or the controller/processor 375).

At 2402, the base station transmits a configuration message associated with a DRX mode of the UE. For example, with reference to FIG. 8, the base station 804 may transmit the configuration message 807 to the UE 802. For example, the configuration message 807 may indicate at least one duration for a DRX cycle, at least one duration for a DRX active time of the DRX cycle, a duration for an inactivity timer, and/or other suitable information for configuring a DRX mode of a UE.

In some examples, the configuration message 807 may include an energy harvesting setting (also referred to as a preconfigured energy harvesting setting) for the UE 802. In some examples, the energy harvesting setting indicates to the UE that the energy harvesting operation is to be performed when the control signal is received during the active time (e.g., a DRX active time of the UE in the DRX mode) and when the control signal is based on a downlink control information format type that includes a wake-up signal indication.

At 2404, the base station transmits a control signal during an active time of the DRX mode, the control signal enabling an energy harvesting operation at the UE in the DRX mode. In some aspects, the control signal may be the control signal 810 described herein. For example, with reference to FIG. 8, the base station 804 may transmit the control signal 810 during a DRX active time of the UE, such as the second DRX active time 914.

In some aspects, the control signal may include control information. In some examples, the control information includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the DRX mode, a second time-frequency resource to be used for the energy harvesting operation during a period in an OFF cycle of the DRX mode extended from the active time or during a period between the active time and a next active time, or a duration of an energy harvesting time for the energy harvesting operation. In some examples, at least a portion of the control information (e.g., a value for a power splitting factor for an energy harvesting operation based on a power splitting scheme) in the control signal is based on the assistance information.

In some examples, the control information includes a bit value in an energy harvesting control field, wherein the bit value enables the energy harvesting operation. For example, the energy harvesting control field may be a one bit field. In this example, the energy harvesting control field may be set to '1' to enable an energy harvesting operation at the UE 802 in the DRX mode or may be set to '0' to disable the energy harvesting operation at the UE 802 in the DRX mode.

In some examples, the control signal includes an indication to skip monitoring of a control channel for at least a portion of the active time of the DRX mode. In one example, with reference to FIGS. 8 and 16, the control information in the control signal 810 may indicate a channel monitoring skipping duration 1610. In some examples, the control signal is based on a downlink control information format type that includes an indication to skip monitoring of a control channel. In some examples, the control signal is based on a first downlink control information format type different from a second downlink control information format type that includes an indication to skip monitoring of a control channel.

In some examples, the control signal includes first configuration information associated with a first energy harvesting scheme for the energy harvesting operation or second configuration information associated with a second energy harvesting scheme for the energy harvesting operation. In some examples, the control signal is associated with a first identifier when the control signal indicates first configuration information associated with a first energy harvesting scheme or second configuration information associated with a second energy harvesting scheme.

In some examples, the control signal indicates a power splitting scheme for the energy harvesting operation. The control information may include at least one of a power splitting factor (e.g., the power splitting factor ρ described with reference to FIG. 7) for the power splitting scheme, a first duration for application of the power splitting scheme (e.g., the first energy harvesting duration 1706) during the active time of the DRX mode when the power splitting factor is set to a value of less than one, a second duration for application of the power splitting scheme (e.g., the second energy harvesting duration 1708) during the active time when the power splitting factor is set to one, a third duration over which the apparatus is to skip monitoring of a control channel during the active time (e.g., the duration 1806 for skipping monitoring of the control channel), or a time-frequency resource to be used for the energy harvesting operation during an OFF cycle of the DRX mode.

In some implementations, with reference to FIGS. 8 and 19, the base station 804 may include DCI based on the DCI format 1900 in the control signal 810 and may transmit the control signal 810 via a control channel (e.g., the PDCCH). The DCI format 1900 may include multiple control information fields, such as a control information field 1902 for a DCI format identifier, a control information field 1904 for a frequency domain resource assignment, and/or other control information fields for carrying control information the UE 802 may need for proper reception and decoding of downlink transmissions.

The DCI format 1900 may include control information fields for carrying control information associated with an energy harvesting operation at the UE 802. In some examples, each of these control information fields may be configured to carry an energy harvesting configuration parameter value as described herein. In one example, the control information field 1906 may be a one bit field which may be set to '1' to enable an energy harvesting operation at the UE 802 in the DRX mode or set to '0' to disable the energy harvesting operation at the UE 802 in the DRX mode.

Figure 25:
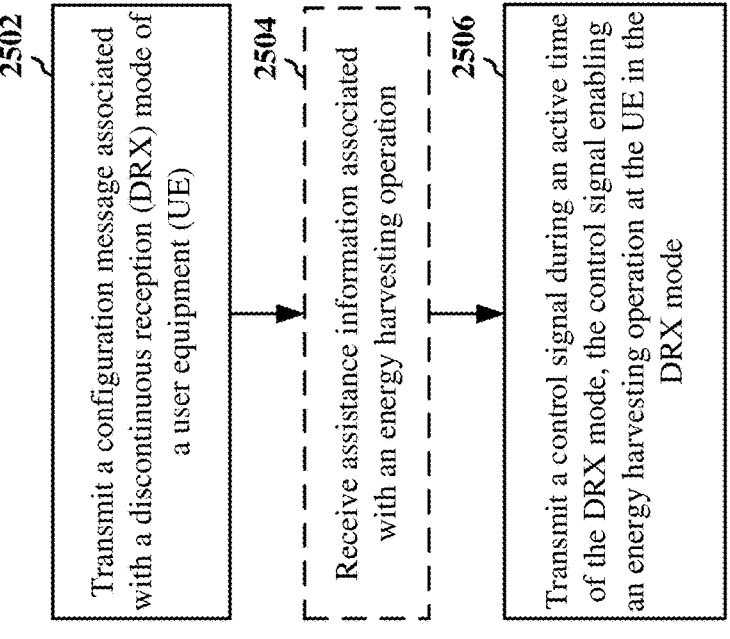
FIG. 25 is a flowchart of a method of wireless communication.

FIG. 25 is a flowchart 2500 of a method of wireless communication. The method may be performed by a base station 102, 804 (e.g., the base station 102, 804; the apparatus 2602/2602'; the processing system 2714, which may include the memory 376 and which may be the entire base station 102, 804 or a component of the base station 102, 804, such as the TX processor 316, the RX processor 370, and/or the controller/processor 375). It should be understood that blocks indicated with dashed lines in FIG. 25 represent optional blocks.

At 2502, the base station transmits a configuration message associated with a DRX mode of the UE. For example, with reference to FIG. 8, the base station 804 may transmit the configuration message 807 to the UE 802. For example, the configuration message 807 may indicate at least one duration for a DRX cycle, at least one duration for a DRX active time of the DRX cycle, a duration for an inactivity timer, and/or other suitable information for configuring a DRX mode of a UE.

In some examples, the configuration message 807 may include an energy harvesting setting (also referred to as a preconfigured energy harvesting setting) for the UE 802. In some examples, the energy harvesting setting indicates to the UE that the energy harvesting operation is to be performed when the control signal is received during the active time (e.g., a DRX active time of the UE in the DRX mode) and when the control signal is based on a downlink control information format type that includes a wake-up signal indication.

At 2504, the base station receives assistance information associated with an energy harvesting operation. For example, with reference to FIG. 8, the assistance information 806 may include a value suggested by the UE 802 for at least one operating parameter of the UE 802. For example, the assistance information 806 may include a suggested value for a power splitting factor for an energy harvesting operation based on a power splitting scheme. In some aspects, the UE 802 may suggest higher values for the power splitting factor (e.g., a value greater than 0.5) if a battery level of the UE 802 is below a threshold and may suggest lower values for the power splitting factor (e.g., a value less than or equal to 0.5) if a battery level of the UE 802 is above the threshold.

At 2506, the base station transmits a control signal during an active time of the DRX mode, the control signal enabling an energy harvesting operation at the UE in the DRX mode. In some aspects, the control signal may be the control signal 810 described herein. For example, with reference to FIG. 8, the base station 804 may transmit the control signal 810 during a DRX active time of the UE, such as the second DRX active time 914.

In some aspects, the control signal may include control information. In some examples, the control information includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the DRX mode, a second time-frequency resource to be used for the energy harvesting operation during a period in an OFF cycle of the DRX mode extended from the active time or during a period between the active time and a next active time, or a duration of an energy harvesting time for the energy harvesting operation. In some examples, at least a portion of the control information (e.g., a value for a power splitting factor for an energy harvesting operation based on a power splitting scheme) in the control signal is based on the assistance information.

In some examples, the control information includes a bit value in an energy harvesting control field, wherein the bit value enables the energy harvesting operation. For example, the energy harvesting control field may be a one bit field. In this example, the energy harvesting control field may be set to '1' to enable an energy harvesting operation at the UE 802 in the DRX mode or may be set to '0' to disable the energy harvesting operation at the UE 802 in the DRX mode.

In some examples, the control signal includes an indication to skip monitoring of a control channel for at least a portion of the active time of the DRX mode. In one example, with reference to FIGS. 8 and 16, the control information in the control signal 810 may indicate a channel monitoring skipping duration 1610. In some examples, the control signal is based on a downlink control information format type that includes an indication to skip monitoring of a control channel. In some examples, the control signal is based on a first downlink control information format type different from a second downlink control information format type that includes an indication to skip monitoring of a control channel.

In some examples, the control signal includes first configuration information associated with a first energy harvesting scheme for the energy harvesting operation or second configuration information associated with a second energy harvesting scheme for the energy harvesting operation. In some examples, the control signal is associated with a first identifier when the control signal indicates first configuration information associated with a first energy harvesting scheme or second configuration information associated with a second energy harvesting scheme.

In some examples, the control signal indicates a power splitting scheme for the energy harvesting operation. The control information may include at least one of a power splitting factor (e.g., the power splitting factor $\rho$ described with reference to FIG. 7) for the power splitting scheme, a first duration for application of the power splitting scheme (e.g., the first energy harvesting duration 1706) during the active time of the DRX mode when the power splitting factor is set to a value of less than one, a second duration for application of the power splitting scheme (e.g., the second energy harvesting duration 1708) during the active time when the power splitting factor is set to one, a third duration over which the apparatus is to skip monitoring of a control channel during the active time (e.g., the duration 1806 for skipping monitoring of the control channel), or a time-frequency resource to be used for the energy harvesting operation during an OFF cycle of the DRX mode.

In some implementations, with reference to FIGS. 8 and 19, the base station 804 may include DCI based on the DCI format 1900 in the control signal 810 and may transmit the control signal 810 via a control channel (e.g., the PDCCH). The DCI format 1900 may include multiple control information fields, such as a control information field 1902 for a DCI format identifier, a control information field 1904 for a frequency domain resource assignment, and/or other control information fields for carrying control information the UE 802 may need for proper reception and decoding of downlink transmissions.

The DCI format 1900 may include control information fields for carrying control information associated with an energy harvesting operation at the UE 802. In some examples, each of these control information fields may be configured to carry an energy harvesting configuration parameter value as described herein. In one example, the control information field 1906 may be a one bit field which may be set to '1' to enable an energy harvesting operation at the UE 802 in the DRX mode or set to '0' to disable the energy harvesting operation at the UE 802 in the DRX mode.

Figure 26:
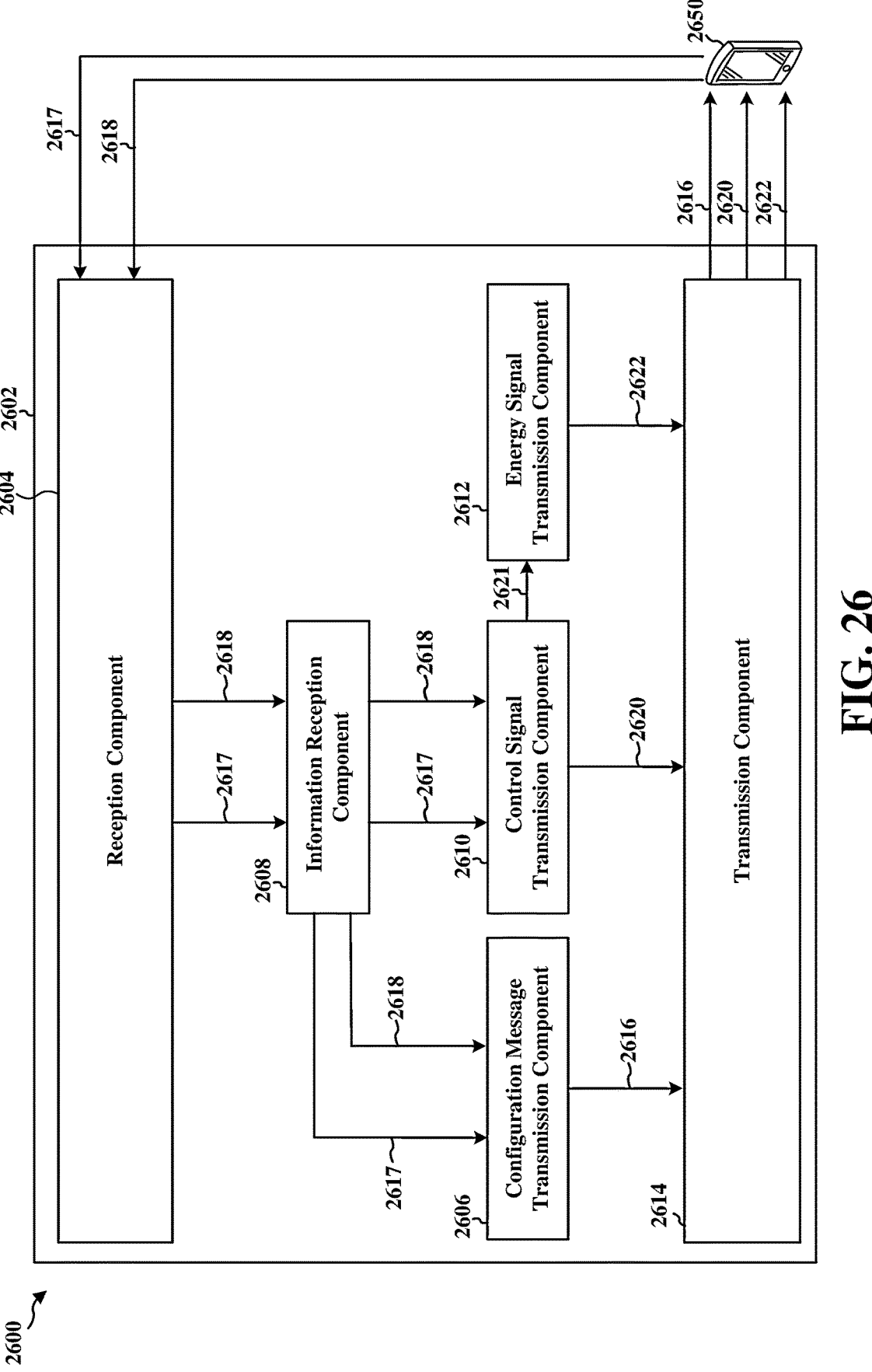
FIG. 26 is a conceptual data flow diagram illustrating the data flow between different means/components in an example apparatus.

FIG. 26 is a conceptual data flow diagram 2600 illustrating the data flow between different means/components in an example apparatus 2602. The apparatus may be a base station.

The apparatus includes a reception component 2604 that receives uplink signals (e.g., the capability information 2617 and assistance information 2618 from the UE 2650).

The apparatus includes a configuration message transmission component 2606 that transmits (e.g., via the transmission component 2614) a configuration message 2616 associated with a DRX mode of the UE 2650. At least a portion of the configuration message 2616 (e.g., a preconfigured energy harvesting setting in the configuration message 2616) is based on the capability information 2617 and/or the assistance information 2618.

The apparatus includes an information reception component 2608 that receives capability information 2617 and assistance information 2618 associated with the energy harvesting operation, wherein at least a portion of control information in the control signal 2620 is based on the capability information 2617 and/or the assistance information 2618.

The apparatus includes a control signal transmission component 2610 that transmits a control signal 2620 during an active time of the DRX mode, the control signal 2620 enabling an energy harvesting operation at the UE 2650 in the DRX mode.

The apparatus includes an energy signal transmission component 2612 that transmits an energy signal 2622 (e.g., a signal the UE 2650 may use to harvest energy).

The apparatus includes a transmission component 2614 that transmits downlink signals (e.g., the configuration message 2616, the control signal 2620) and an energy signal 2622.

The apparatus may include additional components that perform each of the blocks of the algorithm in the aforementioned flowcharts of FIGS. 24 and 25. As such, each block in the aforementioned flowcharts of FIGS. 24 and 25 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 27:
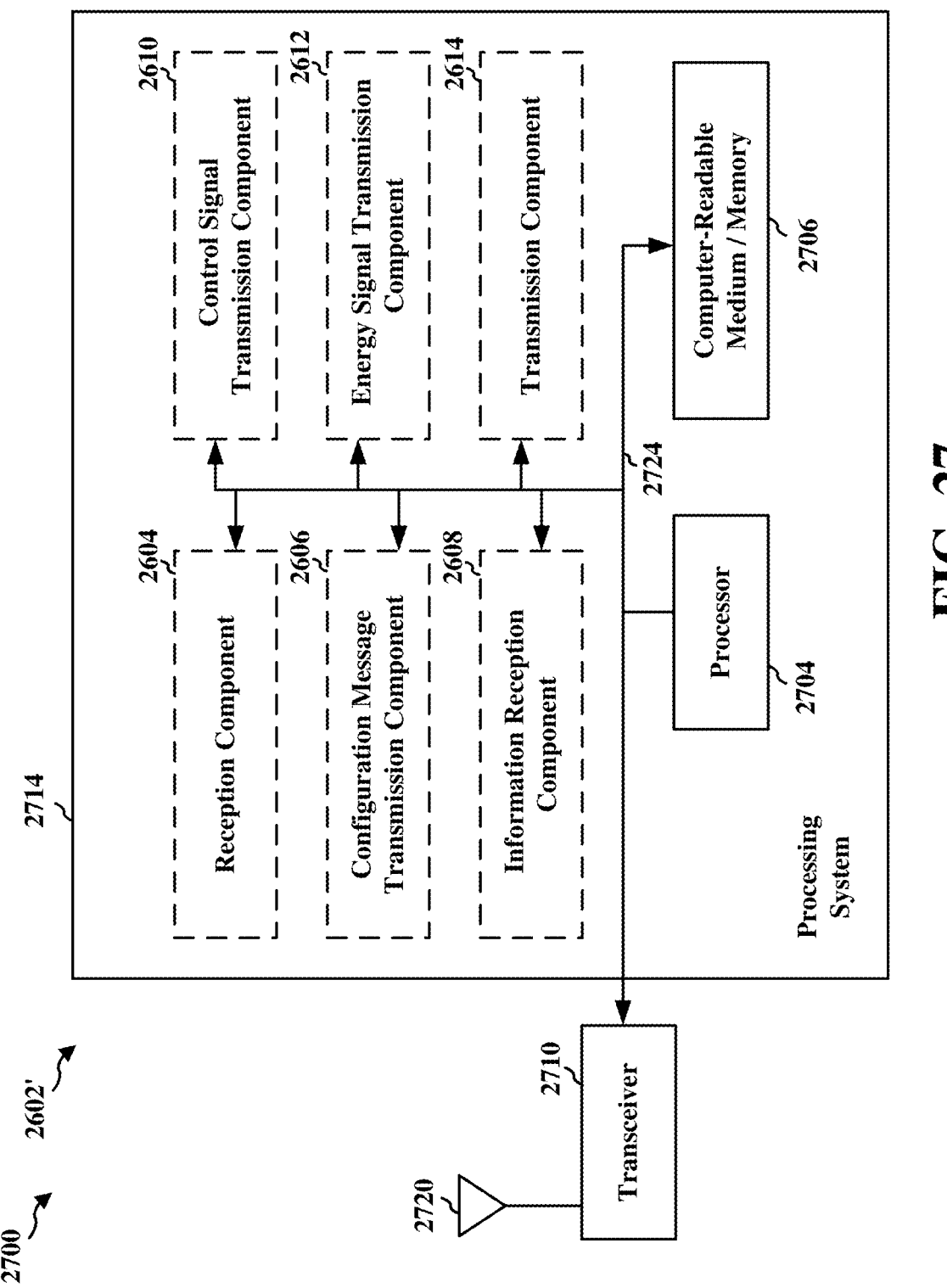
FIG. 27 is a diagram illustrating an example of a hardware implementation for an apparatus employing a processing system.

FIG. 27 is a diagram 2700 illustrating an example of a hardware implementation for an apparatus 2602' employing a processing system 2714. The processing system 2714 may be implemented with a bus architecture, represented generally by the bus 2724. The bus 2724 may include any number of interconnecting buses and bridges depending on the specific application of the processing system 2714 and the overall design constraints. The bus 2724 links together various circuits including one or more processors and/or hardware components, represented by the processor 2704, the components 2604, 2606, 2608, 2610, 2612, 2614, and the computer-readable medium/memory 2706. The bus 2724 may also link various other circuits such as timing sources, peripherals, voltage regulators, and power management circuits, which are well known in the art, and therefore, will not be described any further.

The processing system 2714 may be coupled to a transceiver 2710. The transceiver 2710 is coupled to one or more antennas 2720. The transceiver 2710 provides a means for communicating with various other apparatus over a transmission medium. The transceiver 2710 receives a signal from the one or more antennas 2720, extracts information from the received signal, and provides the extracted information to the processing system 2714, specifically the reception component 2604. In addition, the transceiver 2710 receives information from the processing system 2714, specifically the transmission component 2614, and based on the received information, generates a signal to be applied to the one or more antennas 2720. The processing system 2714 includes a processor 2704 coupled to a computer-readable medium/memory 2706. The processor 2704 is responsible for general processing, including the execution of software stored on the computer-readable medium/memory 2706. The software, when executed by the processor 2704, causes the processing system 2714 to perform the various functions described supra for any particular apparatus. The computer-readable medium/memory 2706 may also be used for storing data that is manipulated by the processor 2704 when executing software. The processing system 2714 further includes at least one of the components 2604, 2606, 2608, 2610, 2612, 2614. The components may be software components running in the processor 2704, resident/stored in the computer readable medium/memory 2706, one or more hardware components coupled to the processor 2704, or some combination thereof. The processing system 2714 may be a component of the base station 310 and may include the memory 376 and/or at least one of the TX processor 316, the RX processor 370, and the controller/processor 375. Alternatively, the processing system 2714 may be the entire base station (e.g., see 310 of FIG. 3).

In one configuration, the apparatus 2602/2602' for wireless communication includes means for transmitting a configuration message associated with a DRX mode of a UE, means for transmitting a control signal during an active time of the DRX mode, the control signal enabling an energy harvesting operation at the UE in the DRX mode, means for receiving assistance information associated with the energy harvesting operation, wherein at least a portion of control information in the control signal is based on the assistance information, and mean for transmitting an energy signal.

The aforementioned means may be one or more of the aforementioned components of the apparatus 2602 and/or the processing system 2714 of the apparatus 2602' configured to perform the functions recited by the aforementioned means. As described supra, the processing system 2714 may include the TX Processor 316, the RX Processor 370, and the controller/processor 375. As such, in one configuration, the aforementioned means may be the TX Processor 316, the RX Processor 370, and the controller/processor 375 configured to perform the functions recited by the aforementioned means.

The aspects described herein may allow control of an energy harvesting operation at a UE (e.g., the UE 802). In some examples, a network node (e.g., a base station) may enable an energy harvesting operation at a UE based on need and/or during certain periods. Moreover, the aspects described herein may allow a UE to reduce its power consumption and immediately enable an energy harvesting device of the UE to begin harvesting energy during an active time of a DRX cycle.

The following provides an overview of aspects of the present disclosure:

Aspect 1: An apparatus for wireless communication, comprising: a memory; and at least one processor coupled to the memory and configured to: enter a discontinuous reception mode; receive a control signal during an active time of the discontinuous reception mode, the control signal enabling an energy harvesting operation in the discontinuous reception mode; and perform the energy harvesting operation in response to the control signal, wherein the energy harvesting operation is performed based on at least one of a reported capability, a preconfigured energy harvesting setting, control information in the control signal, or a combination thereof.

Aspect 2: The apparatus of aspect 1, wherein the control information includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the discontinuous reception mode, a second time-frequency resource to be used for the energy harvesting operation during a period in an OFF cycle of the discontinuous reception mode extended from the active time or during a period between the active time and a next active time, or a duration of an energy harvesting time for the energy harvesting operation.

Aspect 3: The apparatus of aspect 1 or 2, wherein the at least one processor is further configured to: power OFF an information receiver circuit of the apparatus during the active time of the discontinuous reception mode in response to the control signal.

Aspect 4: The apparatus of any of aspects 1 through 3, wherein the preconfigured energy harvesting setting indicates that the energy harvesting operation is to be performed when the control signal is received during the active time and when the control signal is based on a downlink control information format type that includes a wake-up signal indication.

Aspect 5: The apparatus of any of aspects 1 through 4, wherein the wake-up signal indication is set to wake the apparatus or to not wake the apparatus.

Aspect 6: The apparatus of any of aspects 1 through 5, wherein the control signal includes an indication to skip monitoring of a control channel for at least a portion of the active time of the discontinuous reception mode.

Aspect 7: The apparatus of any of aspects 1 through 6, wherein the control signal is based on a first downlink control information format type different from a second downlink control information format type that includes an indication to skip monitoring of a control channel.

Aspect 8: The apparatus of any of aspects 1 through 7, wherein the control signal is based on a downlink control information format type that includes an indication to skip monitoring of a control channel.

Aspect 9: The apparatus of any of aspects 1 through 8, wherein the control signal indicates a power splitting scheme for the energy harvesting operation, and wherein the control information includes at least one of a power splitting factor for the power splitting scheme, a first duration for application of the power splitting scheme during the active time of the discontinuous reception mode when the power splitting factor is set to a value of less than one, a second duration for application of the power splitting scheme during the active time when the power splitting factor is set to one, a third duration over which the apparatus is to skip monitoring of a control channel during the active time, or a time-frequency resource to be used for the energy harvesting operation during an OFF cycle of the discontinuous reception mode.

Aspect 10: The apparatus of any of aspects 1 through 9, wherein the control signal includes first configuration information associated with a first energy harvesting scheme for the energy harvesting operation or second configuration information associated with a second energy harvesting scheme for the energy harvesting operation.

Aspect 11: The apparatus of any of aspects 1 through 10, wherein the control signal is associated with a first identifier when the control signal indicates first configuration information associated with a first energy harvesting scheme or second configuration information associated with a second energy harvesting scheme.

Aspect 12: The apparatus of any of aspects 1 through 11, wherein the control information includes a bit value in an energy harvesting control field, wherein the bit value enables the energy harvesting operation.

Aspect 13: The apparatus of any of aspects 1 through 12, wherein the at least one processor is further configured to: transmit assistance information associated with the energy harvesting operation, wherein at least a portion of the control information in the control signal is based on the assistance information.

Aspect 14; A method of wireless communication, comprising: entering a discontinuous reception mode; receiving a control signal during an active time of the discontinuous reception mode, the control signal enabling an energy harvesting operation in the discontinuous reception mode; and performing the energy harvesting operation in response to the control signal, wherein the energy harvesting operation is performed based on at least one of a reported capability, a preconfigured energy harvesting setting, control information in the control signal, or a combination thereof.

Aspect 15: The method of aspect 14, wherein the control information includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the discontinuous reception mode, a second time-frequency resource to be used for the energy harvesting operation during a period in an OFF cycle of the discontinuous reception mode extended from the active time or during a period between the active time and a next active time, or a duration of an energy harvesting time for the energy harvesting operation.

Aspect 16: The method of aspect 14 or 15, further comprising: powering OFF an information receiver circuit during the active time of the discontinuous reception mode in response to the control signal.

Aspect 17: The method of any of aspects 14 through 16, wherein the preconfigured energy harvesting setting indicates that the energy harvesting operation is to be performed when the control signal is received during the active time and when the control signal is based on a downlink control information format type that includes a wake-up signal indication.

Aspect 18: The method of any of aspects 14 through 17, wherein the wake-up signal indication is set to wake the apparatus or to not wake the apparatus.

Aspect 19: The method of any of aspects 14 through 18, wherein the control signal includes an indication to skip monitoring of a control channel for at least a portion of the active time of the discontinuous reception mode.

Aspect 20: The method of any of aspects 14 through 19, wherein the control signal is based on a first downlink control information format type different from a second downlink control information format type that includes an indication to skip monitoring of a control channel.

Aspect 21: The method of any of aspects 14 through 20, wherein the control signal is based on a downlink control information format type that includes an indication to skip monitoring of a control channel.

Aspect 22: The method of any of aspects 14 through 21, wherein the control signal indicates a power splitting scheme for the energy harvesting operation, and wherein the control information includes at least one of a power splitting factor for the power splitting scheme, a first duration for application of the power splitting scheme during the active time of the discontinuous reception mode when the power splitting factor is set to a value of less than one, a second duration for application of the power splitting scheme during the active time when the power splitting factor is set to one, a third duration over which an apparatus is to skip monitoring of a control channel during the active time, or a time-frequency resource to be used for the energy harvesting operation during an OFF cycle of the discontinuous reception mode.

Aspect 23: The method of any of aspects 14 through 22, wherein the control signal includes first configuration information associated with a first energy harvesting scheme for the energy harvesting operation or second configuration information associated with a second energy harvesting scheme for the energy harvesting operation.

Aspect 24: The method of any of aspects 14 through 23, wherein the control signal is associated with a first identifier when the control signal indicates first configuration information associated with a first energy harvesting scheme or second configuration information associated with a second energy harvesting scheme.

Aspect 25: The method of any of aspects 14 through 24, wherein the control information includes a bit value in an energy harvesting control field, wherein the bit value enables the energy harvesting operation.

Aspect 26: The method of any of aspects 14 through 25, further comprising: transmitting assistance information associated with the energy harvesting operation, wherein at least a portion of the control information in the control signal is based on the assistance information.

Aspect 27; An apparatus for wireless communication, comprising: a memory; and at least one processor coupled to the memory and configured to: transmit a configuration message associated with a discontinuous reception mode of a user equipment (UE); and transmit a control signal during an active time of the discontinuous reception mode, the control signal enabling an energy harvesting operation at the UE in the discontinuous reception mode

Aspect 28: The apparatus of aspect 27, wherein the control signal contains control information that includes at least one of an identifier of a component carrier for the energy harvesting operation, a bandwidth associated with the component carrier, quasi-colocation information associated with an energy harvesting signal for the energy harvesting operation, a first time-frequency resource to be used for the energy harvesting operation during the active time of the discontinuous reception mode, a second time-frequency resource to be used for the energy harvesting operation during an OFF cycle of the discontinuous reception mode, or a duration of an energy harvesting time for the energy harvesting operation.

Aspect 29: The apparatus of aspect 28, wherein the control signal is based on a downlink control information format type that includes a wake-up signal indication.

Aspect 30: The apparatus of any one of aspects 28 through 30, wherein the control signal indicates a power splitting scheme for the energy harvesting operation, and wherein the control information includes at least one of a power splitting factor for the power splitting scheme, a first duration for application of the power splitting scheme during the active time of the discontinuous reception mode when the power splitting factor is set to a value of less than one, a second duration for application of the power splitting scheme during the active time when the power splitting factor is set to one, a third duration over which the apparatus is to skip monitoring of a control channel during the active time, or a time-frequency resource to be used for the energy harvesting operation during an OFF cycle of the discontinuous reception mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C." "one or more of A. B, and C," and "A, B, C. or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element." "device," and the like may not be a substitute for the word "means." As such, no claim element is to be construed as a means plus function unless the element is expressly recited using the phrase "means for."

What is claimed is:

1. An apparatus for wireless communication, comprising:
   a memory;
   a receiver; and
   at least one processor coupled to the memory and the receiver and configured to:
      enter a discontinuous reception mode;
      receive a control signal during an active time of the discontinuous reception mode, the control signal enabling an energy harvesting operation in the discontinuous reception mode; and
      perform the energy harvesting operation during the active time of the discontinuous reception mode and in response to the control signal, wherein, during the energy harvesting operation, the at least one processor and the receiver are configured to convert a wireless signal received at the receiver to electrical energy, and wherein the energy harvesting operation is performed based on at least one of a reported energy harvesting architecture, a reported energy harvesting class, or a combination thereof;
   wherein the energy harvesting operation is performed further based on control information in the control signal and the control information includes at least quasi-colocation information associated with an energy harvesting signal for the energy harvesting operation.

2. The apparatus of claim 1, wherein:
   the control information further includes at least one of an identifier of a component carrier for the energy harvesting operation, a bandwidth associated with the component carrier, a first time-frequency resource to be used for the energy harvesting operation during the active time of the discontinuous reception mode, a second time-frequency resource to be used for the energy harvesting operation during a period in an OFF cycle of the discontinuous reception mode extended from the active time or during a period between the active time and a next active time, or a duration of an energy harvesting time for the energy harvesting operation.

3. The apparatus of claim 1, wherein the at least one processor is further configured to:
   power OFF an information receiver circuit of the apparatus during the active time of the discontinuous reception mode in response to the control signal.

4. The apparatus of claim 1, wherein:
   the energy harvesting operation is performed further based on a preconfigured energy harvesting setting; and
   the preconfigured energy harvesting setting indicates that the energy harvesting operation is to be performed when the control signal is received during the active time and when the control signal is based on a downlink control information format type that includes a wake-up signal indication.

5. The apparatus of claim 4, wherein the wake-up signal indication is set to wake the apparatus or to not wake the apparatus.

6. The apparatus of claim 1, wherein:

the control signal includes an indication to skip monitoring of a control channel for at least a portion of the active time of the discontinuous reception mode.

7. The apparatus of claim 1, wherein:

the control signal is based on a first downlink control information format type different from a second downlink control information format type that includes an indication to skip monitoring of a control channel.

8. The apparatus of claim 1, wherein:

the control signal is based on a downlink control information format type that includes an indication to skip monitoring of a control channel.

9. The apparatus of claim 1, wherein:

the control signal indicates a power splitting scheme for the energy harvesting operation, and wherein the control information includes at least one of a power splitting factor for the power splitting scheme, a first duration for application of the power splitting scheme during the active time of the discontinuous reception mode when the power splitting factor is set to a value of less than one, a second duration for application of the power splitting scheme during the active time when the power splitting factor is set to one, a third duration over which the apparatus is to skip monitoring of a control channel during the active time, or a time-frequency resource to be used for the energy harvesting operation during an OFF cycle of the discontinuous reception mode.

10. The apparatus of claim 1, wherein:

the control signal includes first configuration information associated with a first energy harvesting scheme for the energy harvesting operation or second configuration information associated with a second energy harvesting scheme for the energy harvesting operation.

11. The apparatus of claim 10, wherein:

the control signal is associated with a first identifier when the control signal includes the first configuration information associated with the first energy harvesting scheme or the second configuration information associated with the second energy harvesting scheme.

12. The apparatus of claim 1, wherein:

the control information includes a bit value in an energy harvesting control field, wherein the bit value enables the energy harvesting operation.

13. The apparatus of claim 1, wherein the at least one processor is further configured to:

transmit assistance information associated with the energy harvesting operation, wherein at least a portion of the control information in the control signal is based on the assistance information.

14. A method of wireless communication, comprising:

entering a discontinuous reception mode;

receiving a control signal during an active time of the discontinuous reception mode, the control signal enabling an energy harvesting operation in the discontinuous reception mode; and performing the energy harvesting operation during the active time of the discontinuous reception mode and in response to the control signal, wherein the energy harvesting operation is performed based on at least one of a reported energy harvesting architecture, a reported energy harvesting class, or a combination thereof, and wherein the energy harvesting operation comprises converting a received wireless signal to electrical energy;

wherein the energy harvesting operation is performed further based on control information in the control signal and the control information includes at least quasi-colocation information associated with an energy harvesting signal for the energy harvesting operation.

15. The method of claim 14, wherein:

the control information further includes at least one of an identifier of a component carrier for the energy harvesting operation, a bandwidth associated with the component carrier, a first time-frequency resource to be used for the energy harvesting operation during the active time of the discontinuous reception mode, a second time-frequency resource to be used for the energy harvesting operation during a period in an OFF cycle of the discontinuous reception mode extended from the active time or during a period between the active time and a next active time, or a duration of an energy harvesting time for the energy harvesting operation.

16. The method of claim 14, further comprising:

powering off an information receiver circuit during the active time of the discontinuous reception mode in response to the control signal.

17. The method of claim 16, wherein:

the energy harvesting operation is performed further based on a preconfigured energy harvesting setting; and the preconfigured energy harvesting setting indicates that the energy harvesting operation is to be performed when the control signal is received during the active time and when the control signal is based on a downlink control information format type that includes a wake-up signal indication.

18. The method of claim 17, wherein the wake-up signal indication is set to wake the apparatus or to not wake the apparatus.

19. The method of claim 14, wherein:

the control signal includes an indication to skip monitoring of a control channel for at least a portion of the active time of the discontinuous reception mode.

20. The method of claim 14, wherein:

the control signal is based on a first downlink control information format type different from a second downlink control information format type that includes an indication to skip monitoring of a control channel.

21. The method of claim 14, wherein;

the control signal is based on a downlink control information format type that includes an indication to skip monitoring of a control channel.

22. The method of claim 14, wherein:

the control signal indicates a power splitting scheme for the energy harvesting operation, and wherein the control information includes at least one of a power splitting factor for the power splitting scheme, a first duration for application of the power splitting scheme during the active time of the discontinuous reception mode when the power splitting factor is set to a value of less than one, a second duration for application of the power splitting scheme during the active time when the power splitting factor is set to one, a third duration over which an apparatus is to skip monitoring of a control channel during the active time, or a time-frequency resource to be used for the energy harvesting operation during an OFF cycle of the discontinuous reception mode.

23. The method of claim 14, wherein:

the control signal includes first configuration information associated with a first energy harvesting scheme for the energy harvesting operation or second configuration information associated with a second energy harvesting scheme for the energy harvesting operation.

24. The method of claim 23, wherein:

the control signal is associated with a first identifier when the control signal includes the first configuration information associated with the first energy harvesting scheme or the second configuration information associated with the second energy harvesting scheme.

25. The method of claim 14, wherein:

the control information includes a bit value in an energy harvesting control field, wherein the bit value enables the energy harvesting operation.

26. The method of claim 14, further comprising:

transmitting assistance information associated with the energy harvesting operation, wherein at least a portion of the control information in the control signal is based on the assistance information.

27. An apparatus for wireless communication, comprising:

a memory; and at least one processor coupled to the memory and configured to:

transmit a configuration message associated with a discontinuous reception mode of a user equipment (UE); and transmit a control signal during an active time of the discontinuous reception mode, the control signal enabling an energy harvesting operation at the UE during the active time of the discontinuous reception mode, wherein, during the energy harvesting operation, the UE is configured to convert a wireless signal received at the UE to electrical energy;

wherein the energy harvesting operation is performed further based on control information in the control signal and the control information includes at least quasi-colocation information associated with an energy harvesting signal for the energy harvesting operation.

28. The apparatus of claim 27, wherein:

the control information further includes at least one of an identifier of a component carrier for the energy harvesting operation, a bandwidth associated with the component carrier, a first time-frequency resource to be used for the energy harvesting operation during the active time of the discontinuous reception mode, a second time-frequency resource to be used for the energy harvesting operation during an OFF cycle of the discontinuous reception mode, or a duration of an energy harvesting time for the energy harvesting operation.

29. The apparatus of claim 27, wherein:

the control signal is based on a downlink control information format type that includes a wake-up signal indication.

30. The apparatus of claim 27, wherein:

the control signal indicates a power splitting scheme for the energy harvesting operation, and wherein the control information includes at least one of a power splitting factor for the power splitting scheme, a first duration for application of the power splitting scheme during the active time of the discontinuous reception mode when the power splitting factor is set to a value of less than one, a second duration for application of the power splitting scheme during the active time when the power splitting factor is set to one, a third duration over which the apparatus is to skip monitoring of a control channel during the active time, or a time-frequency resource to be used for the energy harvesting operation during an OFF cycle of the discontinuous reception mode.

31. The apparatus of claim 1, wherein the quasi-colocation information comprises at least one transmission configuration indicator (TCI) state associated with the energy harvesting signal for the energy harvesting operation.

32. The apparatus of claim 27, wherein the quasi-colocation information comprises at least one transmission configuration indicator (TCI) state associated with the energy harvesting signal for the energy harvesting operation.

* * * * *